Feb. 12, 1957
R. A. WILKINS
2,781,257
METHOD AND APPARATUS FOR RECOVERING ZINC
Filed June 23, 1952
11 Sheets-Sheet 2
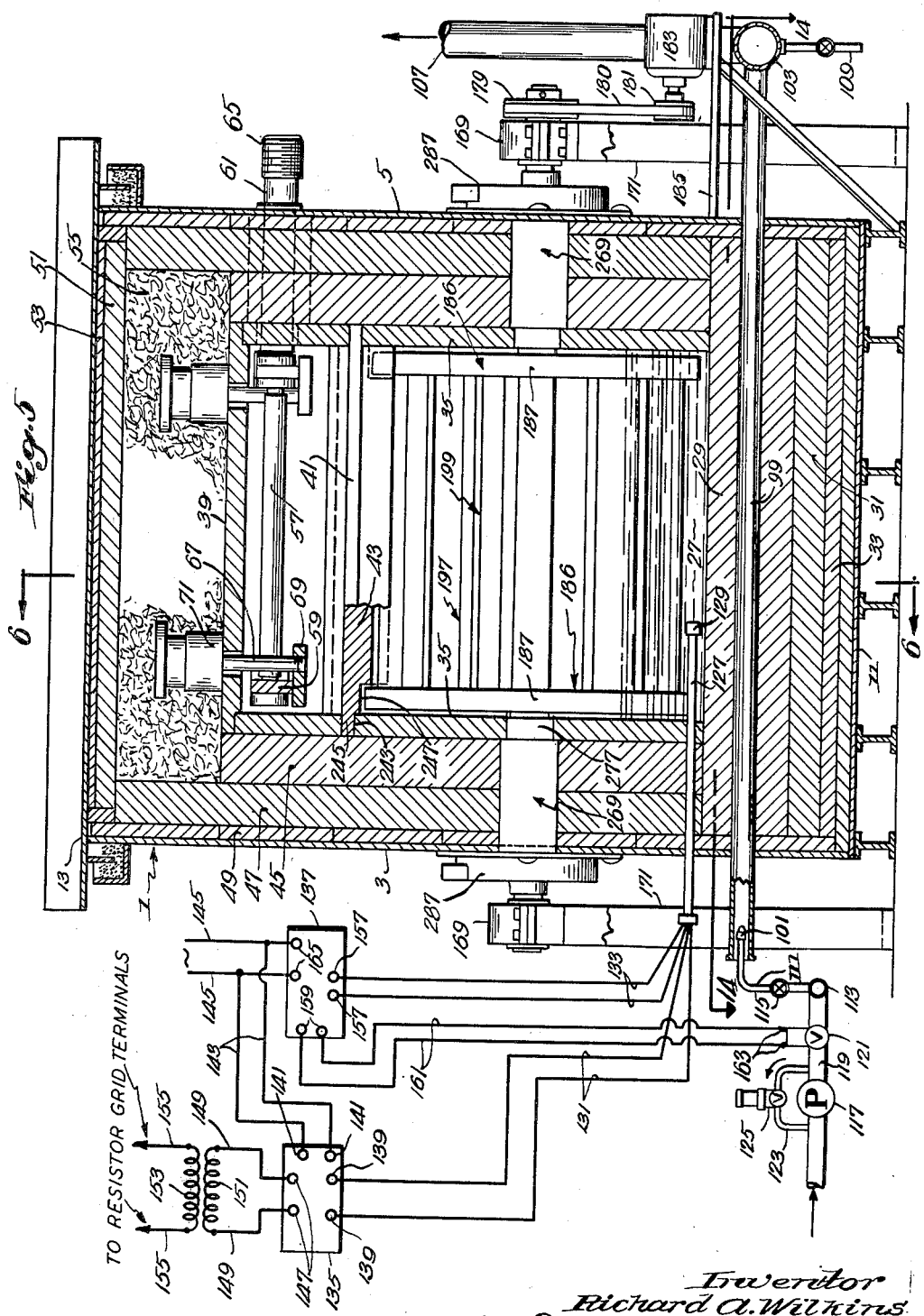
Inventor
Richard A. Wilkins

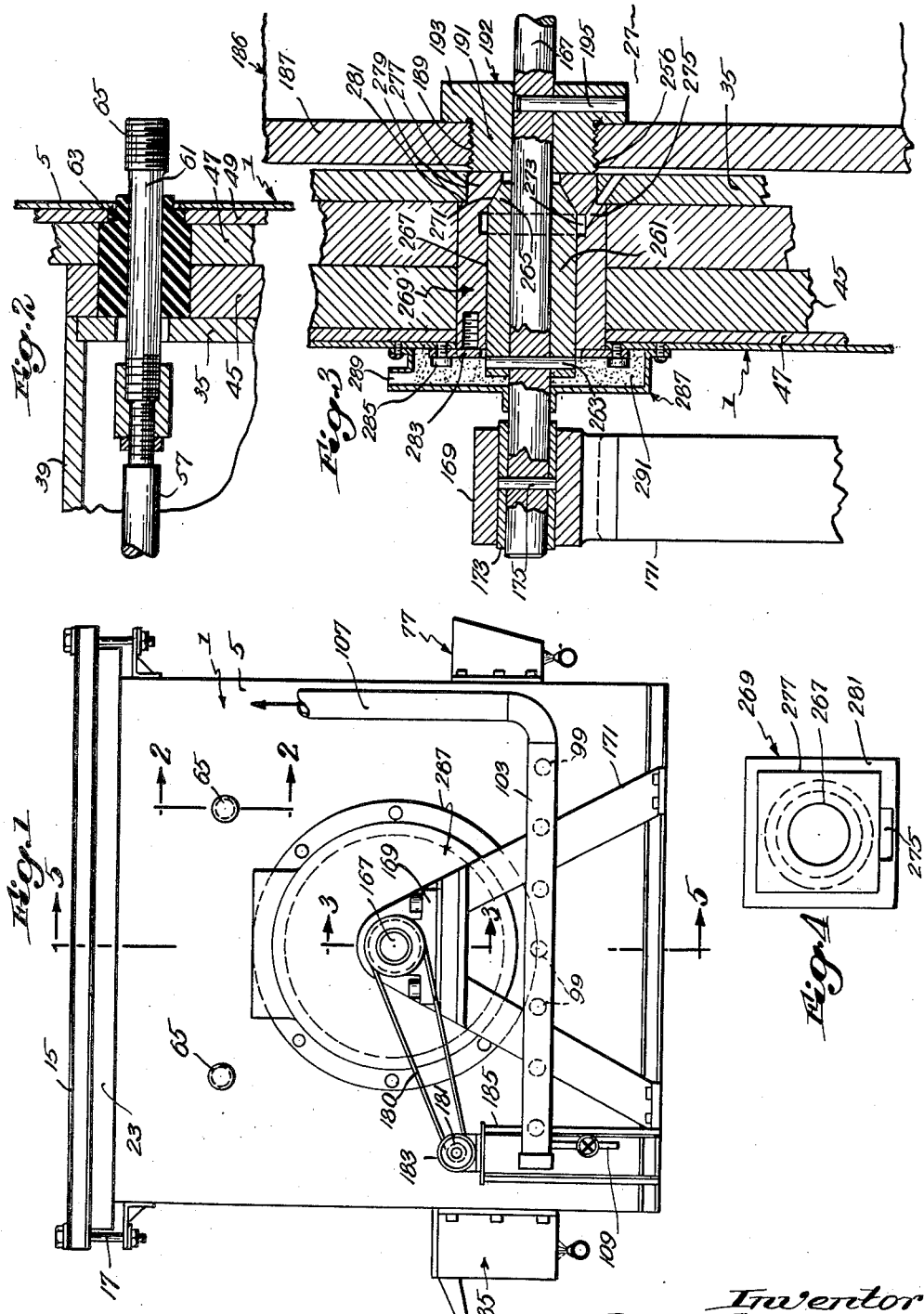

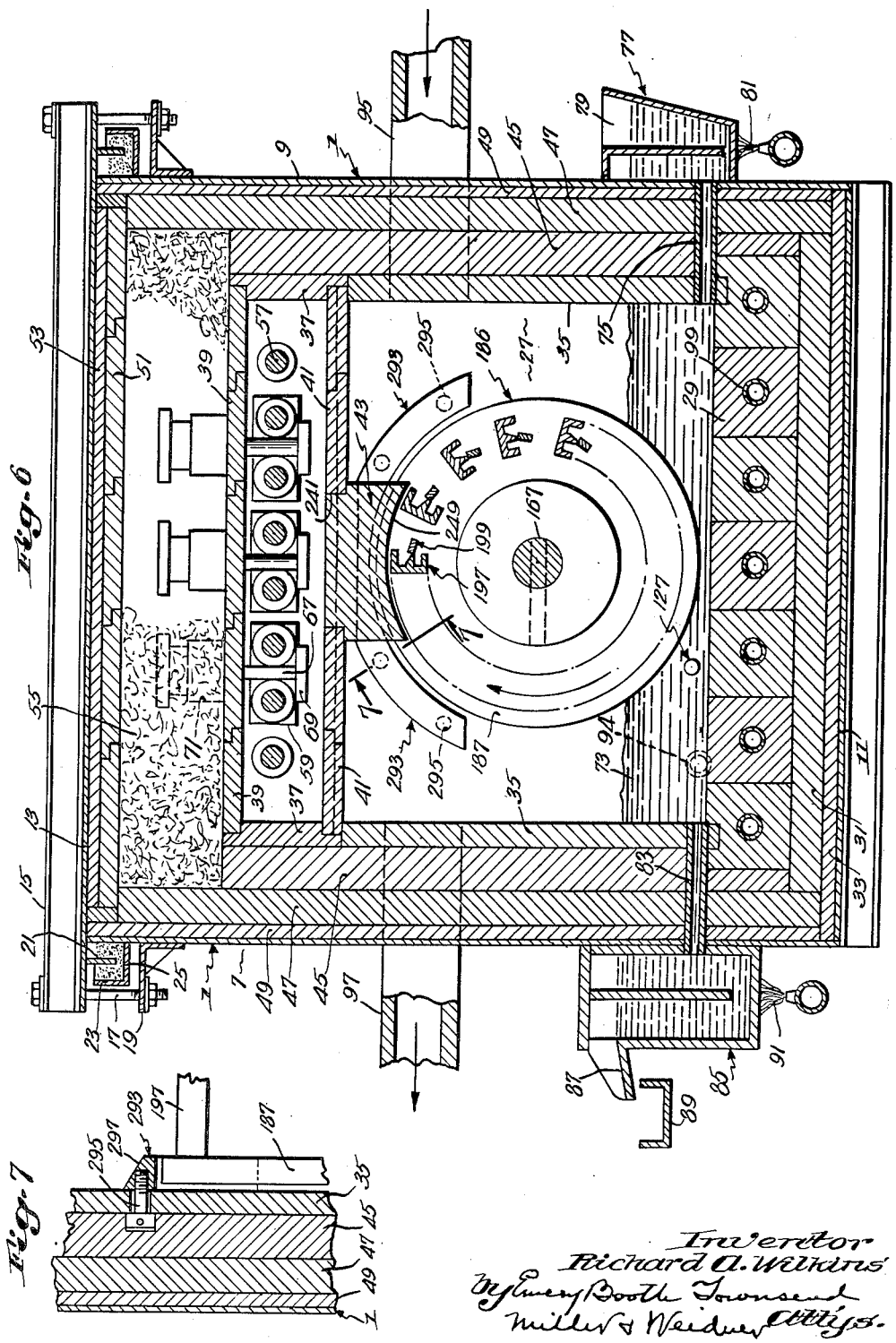

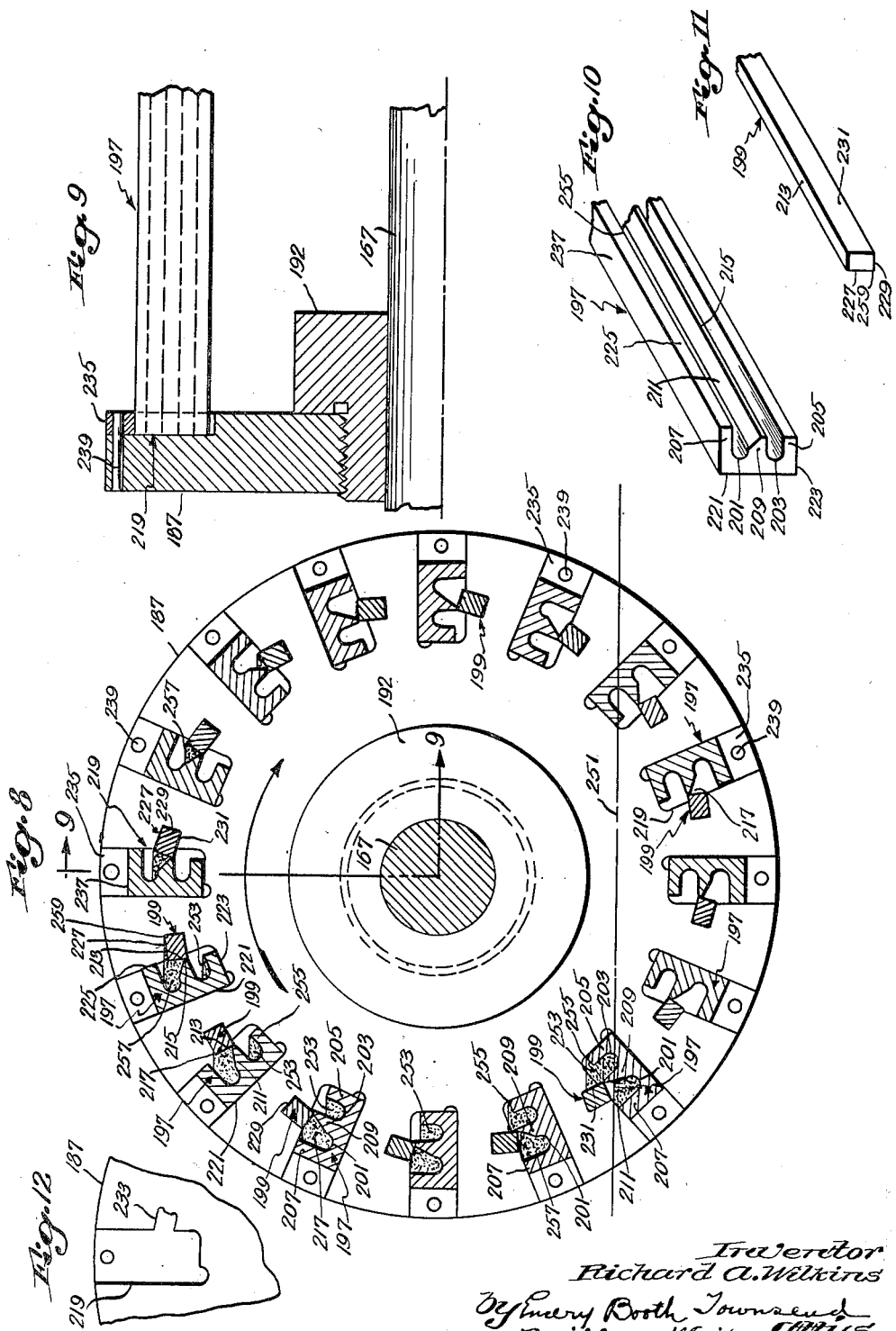

Feb. 12, 1957  R. A. WILKINS  2,781,257
METHOD AND APPARATUS FOR RECOVERING ZINC
Filed June 23, 1952  11 Sheets-Sheet 5
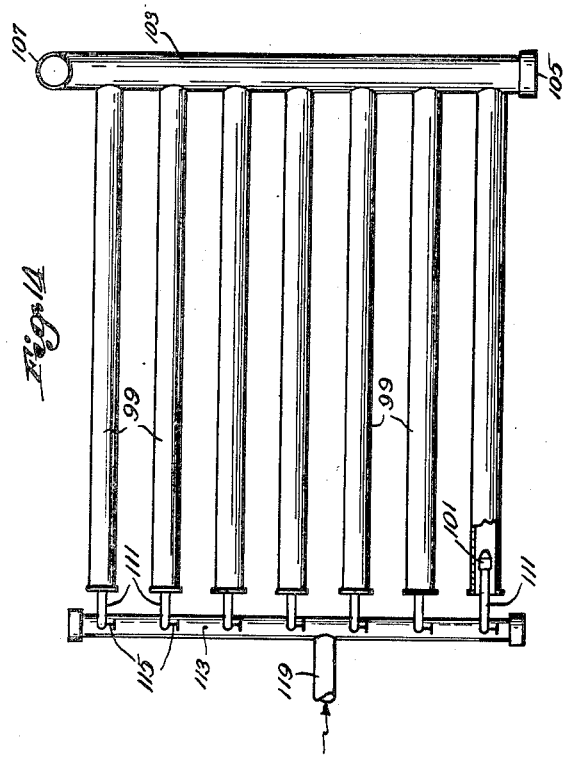
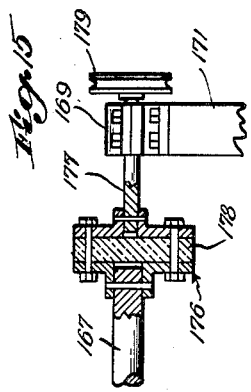
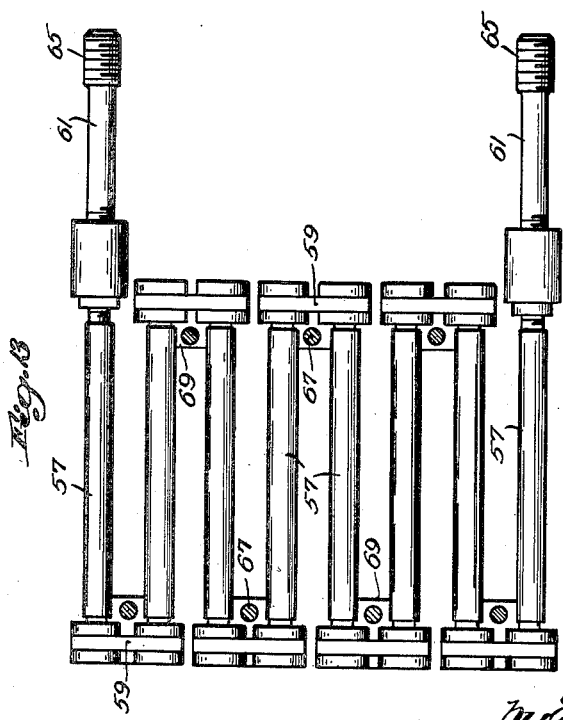
Inventor
Richard A. Wilkins
by Ewery Booth Townsend
Miller & Weidner Attys.

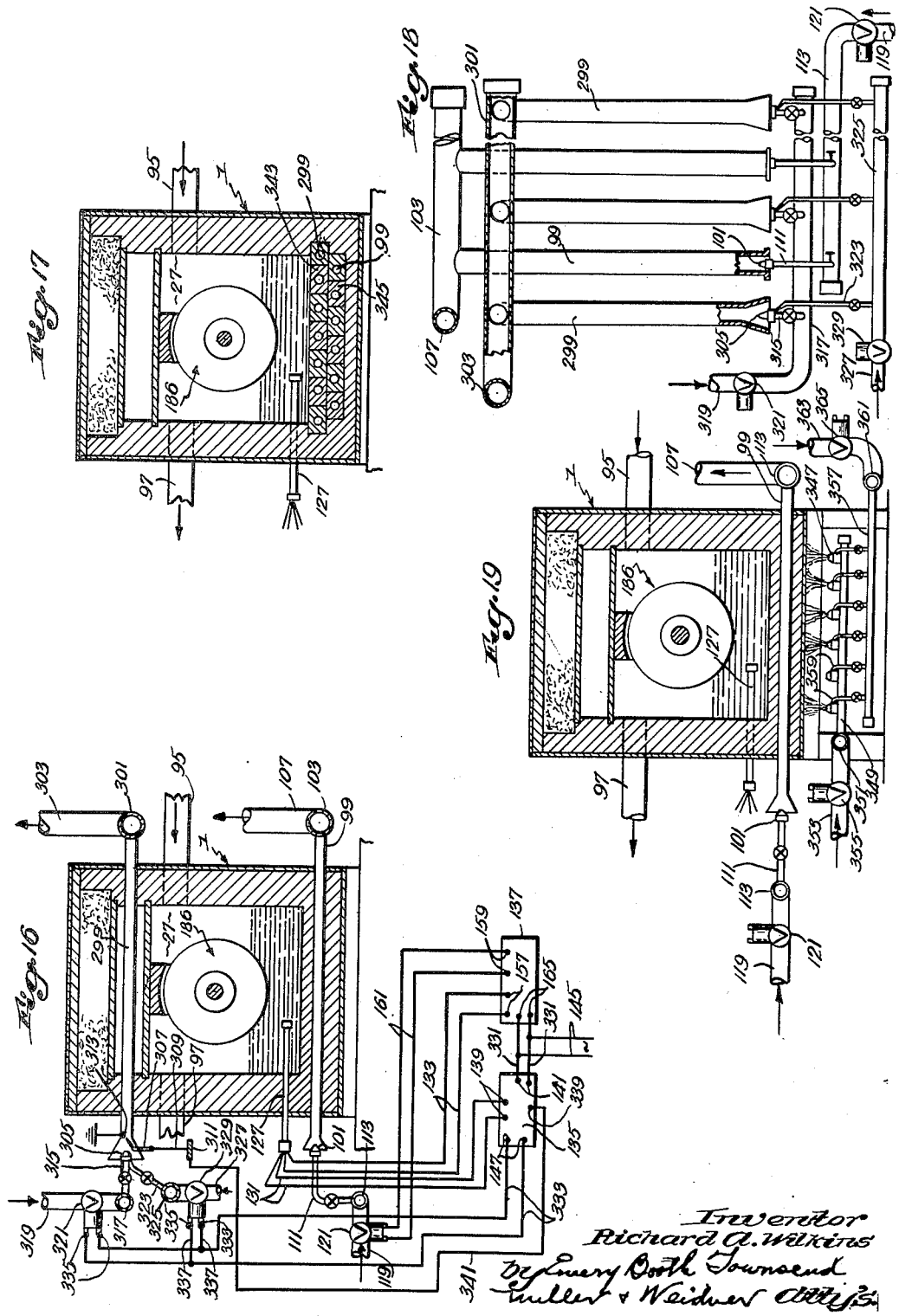

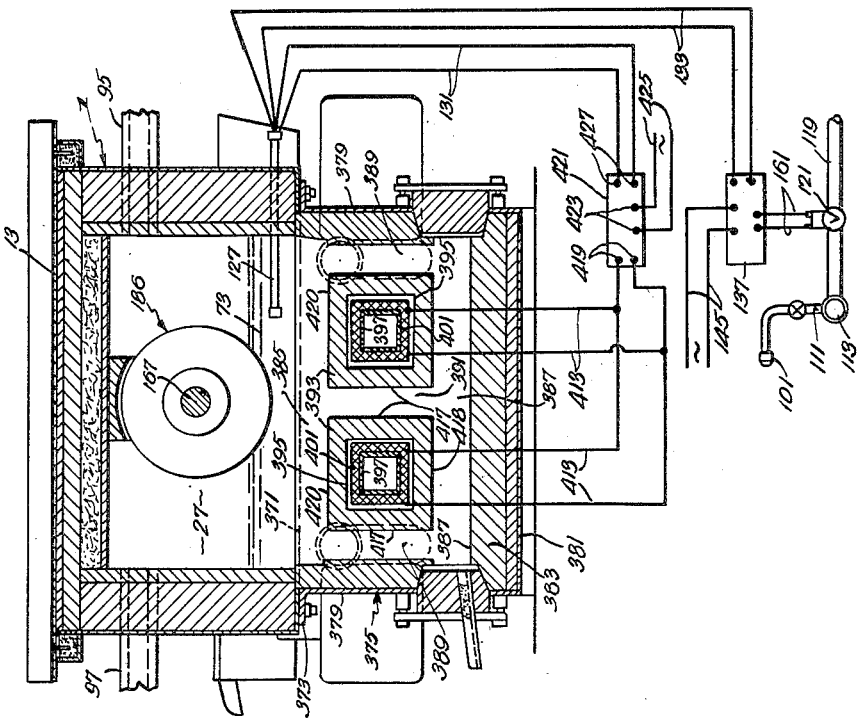

Feb. 12, 1957  R. A. WILKINS  2,781,257
METHOD AND APPARATUS FOR RECOVERING ZINC
Filed June 23, 1952  11 Sheets-Sheet 8
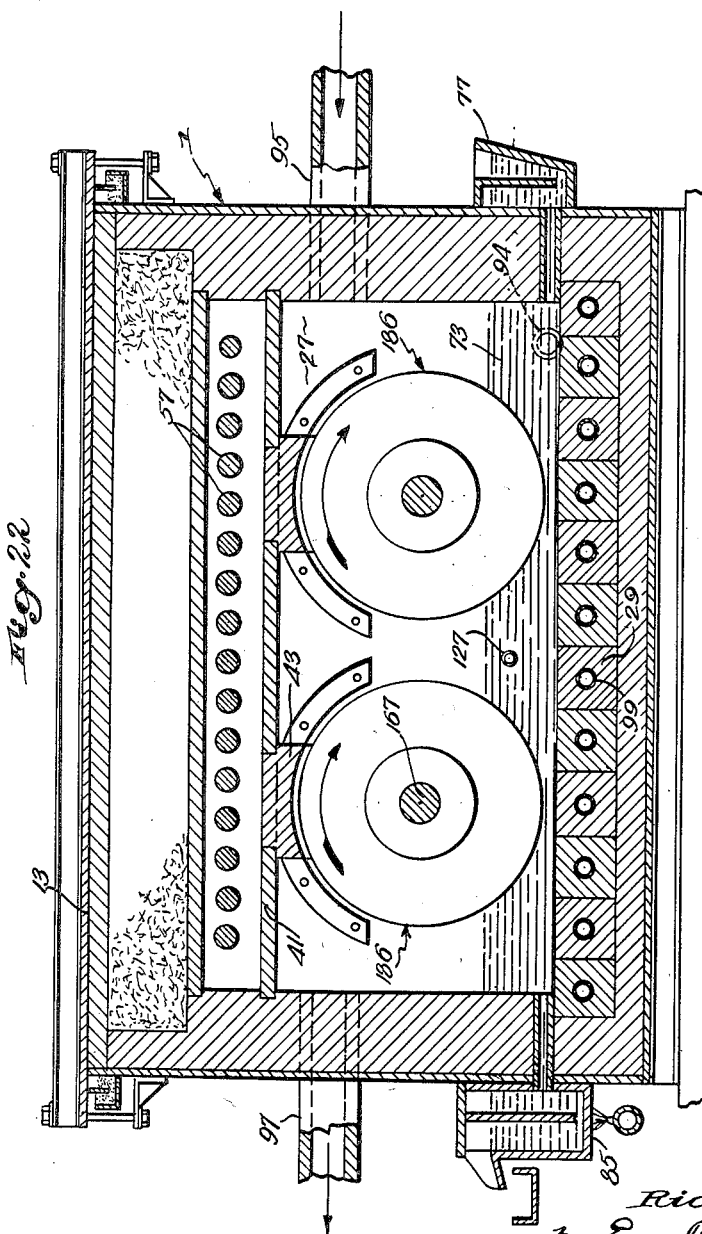
Inventor
Richard A. Wilkins

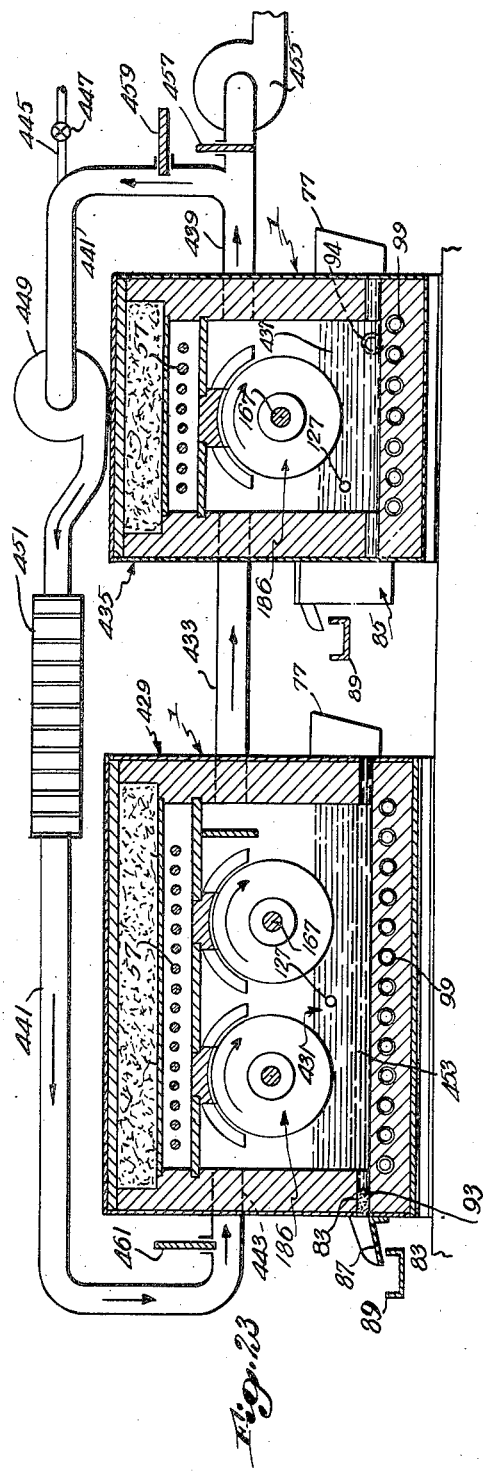

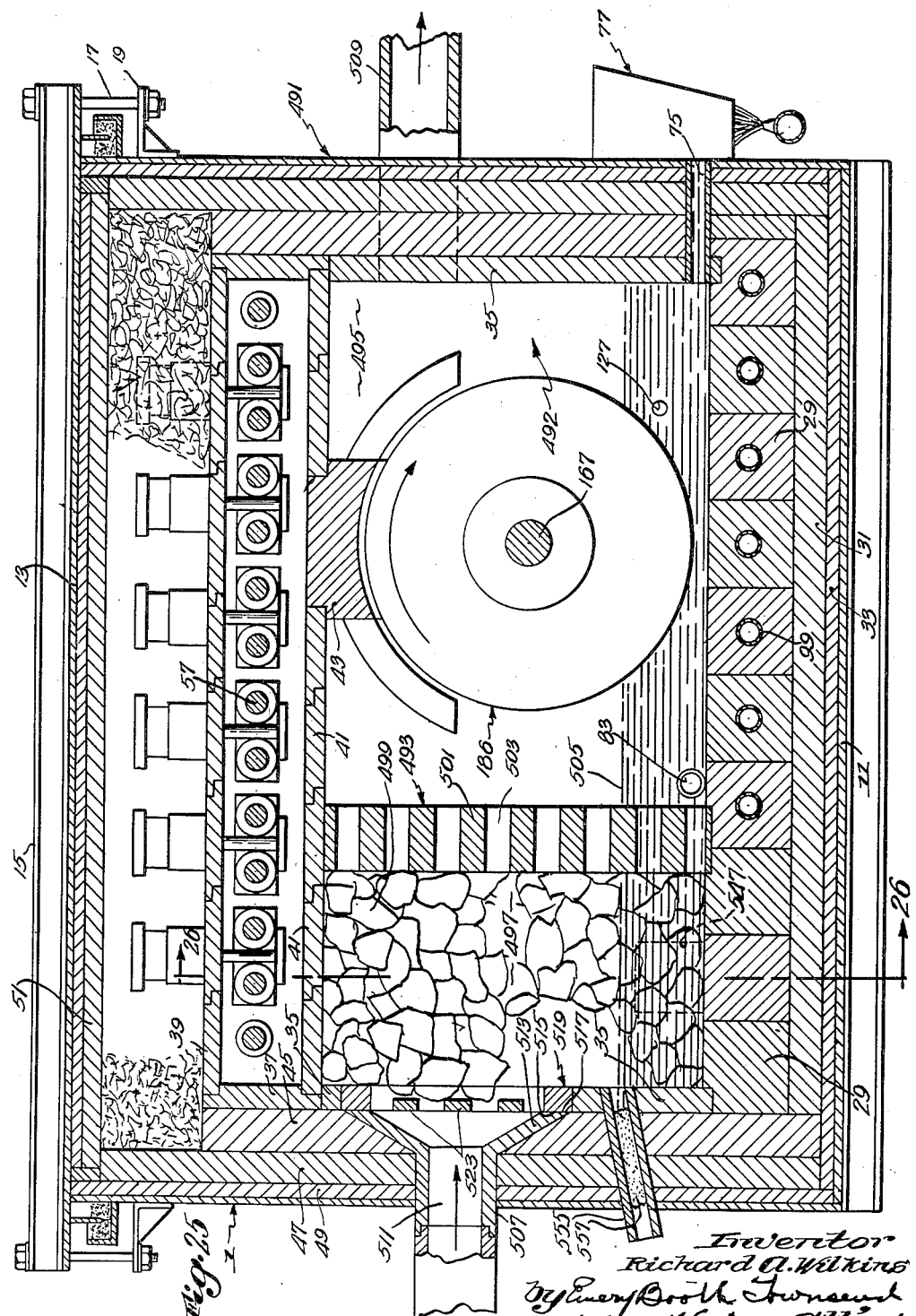

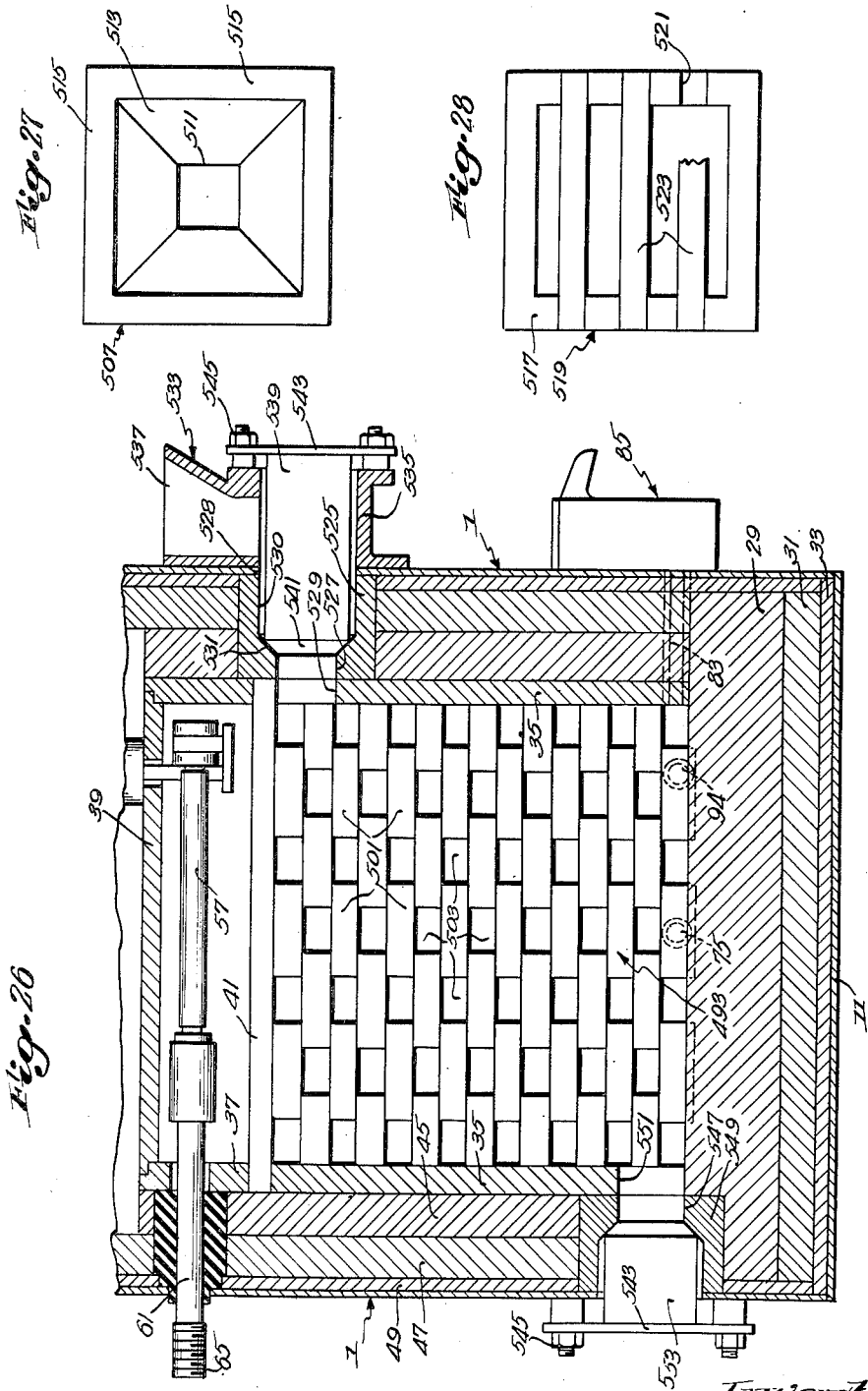

United States Patent Office 2,781,257
Patented Feb. 12, 1957

2,781,257

METHOD AND APPARATUS FOR RECOVERING ZINC

Richard A. Wilkins, Rome, N. Y., assignor to Revere Copper and Brass Incorporated, Rome, N. Y., a corporation of Maryland Application June 23, 1952, Serial No. 295,040

25 Claims. (Cl. 75—88)

My invention relates to the treatment of zinc, particularly evaporating zinc to form zinc vapors, condensing vaporous zinc to liquid zinc, and purifying zinc by use of condensers and by use of evaporators and condensers.

The invention has among its objects methods of and apparatus for evaporating zinc, and of and for condensing zinc or an impurity thereof, involving an improved way of effecting contact between a zinc or other bath and the vaporous zinc above such bath.

The invention has among its other objects methods of and apparatus for recovering substantially chemically pure zinc, or zinc having the relatively low lead content of so-called "Prime Western Zinc," or both, from zinc having a relatively high lead content, or from the mixture of reaction gases and zinc vapors containing lead discharged from zinc smelting retorts, or from zinc vapors containing lead discharged from other retorts treating zinciferous material.

From certain aspects the invention includes an improvement on the method and apparatus described in Handwerk et al. United States Patent 2,457,544, dated December 28, 1948. According to this patent, a stream of zinc vapors is sought to be condensed to the liquid state by passing it through a chamber above a zinc bath in the bottom of such chamber. That chamber contains a high speed rotor partially immersed in the bath. This rotor continuously and violently hurls upwardly by centrifugal action a shower of the bath metal that rains back into the bath. Such method and apparatus, although usable, even in many instances as a substitute for the rotor in the apparatus herein described, have certain defects that render their use objectionable. The high speed of the rotor presents mechanical difficulties. Further, the random hurling of the bath liquid and resultant random contact of it with the flowing and whirling stream of zinc vapors do not give a wholly satisfactory control of the condensing operation, because certain parts of the stream flow more rapidly than other parts and the density of the shower varies in different parts of the chamber. It is among the objects of the present invention to correct these defects by employing a rotor partially laterally immersed in the bath, the walls of the chamber and those of the submerged part of such rotor coacting to divide the chamber into compartments at opposite lateral sides of the rotor, which compartments are connected with each other by openings presented by the rotor so that the stream of vaporous zinc in its passage through the chamber must pass through the rotor from one lateral side thereof to the other. In such improved apparatus the rotor is rotated at low speed, and is provided with buckets or the like which scoop liquid metal from the bath and lift it and pour it from the buckets in such way as acts to rain it in the form of spaced unsupported curtains of bath metal extending longitudinally of the rotor and transversely of the direction of flow of the zinc vapors. In this way the improved apparatus avoids the objections of such high speed rotor and, by not acting to divide finely the raining bath metal, and by causing the zinc vapors to contact such raining metal at a portion of the chamber where the temperature of such vapors is not affected by contact with relatively cold portions of the chamber walls, acts to minimize the formation of both chemical and mechanical blue powder and to insure equal contact of all parts of the stream of zinc vapors with the raining bath metal.

The above and other objects of the invention, however, will be best understood from the following description when read in the light of the accompanying drawings, while the scope of the invention will be more particularly pointed out in the appended claims.

In the drawings:

Fig. 1 is an end elevation of apparatus according to the present invention, corresponding to Fig. 5 as viewed from the right;

Figs. 2 and 3 are, respectively, fragmentary sections on the lines 2—2 and 3—3 of Fig. 1, on an enlarged scale;

Fig. 4 shows a detail of the parts illustrated by Fig. 3;

Fig. 5 is a section on the line 5—5 of Fig. 1 on an enlarged scale, with parts in elevation, Fig. 5 also including a schematic wiring diagram of the means for controlling the temperature of the bath;

Fig. 6 is a section on the line 6—6 of Fig. 5;

Fig. 7 is a fragmentary section on the line 7—7 of Fig. 6;

Fig. 8 is an enlarged view of the rotor as shown in section in Fig. 6, Fig. 8 also diagrammatically illustrating the operation of the rotor of the bath;

Fig. 9 is a section on the line 9—9 of Fig. 8;

Fig. 10 is an isometric view of an end portion of one of the bars in which buckets of the rotor are formed;

Fig. 11 is an isometric view of an end portion of the bar associated with the bar of Fig. 10 to form part of one of the buckets provided by the last mentioned bar;

Fig. 12 is a fragmentary view of the rotor as shown in Fig. 11, with parts omitted;

Fig. 13 is a plan of the resistor grid of the apparatus shown by Figs. 1 to 12;

Fig. 14 is a section on the line 14—14 of Fig. 5, with parts omitted;

Fig. 15 shows a modified form of bearing for the rotor;

Fig. 16 more or less schematically illustrates a modification of the apparatus according to Figs. 1 to 15, including a schematic wiring diagram of the means for controlling the bath temperature;

Fig. 17 more or less diagrammatically illustrates a further modification of the apparatus according to Figs. 1 to 15;

Fig. 18 more or less diagrammatically illustrates the temperature controlling means for the bath of the apparatus according to Fig. 17;

Fig. 19 more or less diagrammatically illustrates a still further modification of the apparatus according to Figs. 1 to 15;

Fig. 20 more or less diagrammatically illustrates a yet further modification of the apparatus according to Figs. 1 to 15, with parts omitted;

Fig. 21 is a section on the line 21—21 of Fig. 20, and includes a schematic wiring diagram for the heating and cooling means for the bath;

Fig. 22 illustrates another modification of the apparatus according to Figs. 1 to 15, with parts omitted;

Fig. 23 more or less diagrammatically illustrates an application of apparatus according to the invention for use in refining impure zinc;

Fig. 24 more or less diagrammatically illustrates an application of the apparatus according to the invention for use in recovering zinc from the mixture of gases and zinciferous vapors discharged from a zinc smelting or other zinc retort;

Fig. 25 is a longitudinal section of a further modified unit having provision for removing carbon dioxide from the mixture of metal vapors and effluent gases charged to it;

Fig. 26 is a section on the line 26—26 of Fig. 25, with parts omitted; and

Figs. 27 and 28 show details of parts illustrated by Fig. 25.

The apparatus shown by Figs. 1 to 15 comprises a metallic casing 1 having opposite lateral walls 3 and 5, opposite lateral walls 7 and 9, and a bottom wall 11. These walls are formed of metal plates welded together to form an air tight structure. Closing the open top of the casing is a metal cover plate 13. Across the cover plate extend spaced bars 15 resting thereon, these bars being secured at their end portions by bolts 17 to brackets 19 welded to the lateral walls of the casing, in this way to hold the cover in place. As shown, a flange 21 is welded to the under side of the cover adjacent its peripheral edge, which flange extends continuously entirely around the cover. This flange projects downwardly into the space between the lateral walls of the casing and the vertical flange 23 of a angle-iron structure, the horizontal flange 25 of which structure at its free edge is welded to the lateral walls of the casing, this angle-iron structure extending continuously entirely around the casing. The space between the lateral walls of the casing and the flange 23 is filled with sand, oil, or the like, into which the flange 21 extends whereby to seal the joint between the cover and the casing.

Interiorly of the casing are walls built up to form a chamber 27. As shown, the bottom of this chamber is formed of elongated laterally abutting square bars 29 of graphite, hard carbon, silicon carbide, high purity alumina, or other heat refractory material. These bars are shown as resting on a heat refractory heat insulating layer 31, which latter may be formed of heat insulating firebrick. The layer 31 in turn rests on a layer 33 which may be formed of ordinary firebrick.

The interior lateral walls of the lower portion of the chamber 27 are shown as formed of slabs 35 of heat refractory material such as that of which the bars 29 are formed, while the corresponding walls of the upper portion of the chamber are formed of slabs 37 which preferably are of graphite, these slabs 37 at their lower edges resting on tthe upper edges of the slabs 35. Supported on the upper edges of the slabs 37 are shown abutting horizontal slabs 39, which form the roof of the chamber, and preferably are of graphite. The upper and lower portions of the chamber are shown as separated from each other by a heat conducting partition formed of abutting slabs 41 and a baffle bar 43 which also are preferably of graphite.

The several vertical slabs 35 and 37 of the chamber 27 are shown as backed by a heat insulating layer 45 which may be formed of highly heat refractory heat insulating firebrick, the layer 45 in turn being backed by a layer 47 which may be of ordinary firebrick, while interposed between the layer 47 and the lateral walls of the metallic casing are shown slabs 49 of heat refractory resiliently compressible sheet material for relieving the metallic casing of the stresses tended to be exerted on it by the other walls of the chamber 27 when said walls are heated and expand. As shown, resting on the upper edges of the firebrick layers 47 are heat refractory slabs 51, while interposed between such slabs and the metal cover plate 13 of the casing is a further layer 53 of heat refractory resiliently compressible sheet material for relieving the cover plate 13 of stresses tended to be imparted to it from below. The space between the slabs 39 and 51, as shown, is filled with a mass 55 of heat refractory heat insulating material such as carbon beads.

In the space between the slabs 39 and the partition formed by the slabs 41 and baffle bar 43 is positioned a resistor grid which, as best shown by Fig. 13, comprises a row of resistor bars 57 preferably of graphite. Opposite alternate ends of the resistor bars 57 are shown as electrically and mechanically connected by plates 59 of graphite, while the free ends of the resistor bars at the ends of the row are coupled to extensions 61 also preferably of graphite, which extensions, as best shown by Fig. 2, project through heat refractory electric insulating blocks 63 to the exterior of the casing where each is provided with a terminal portion 65 for connection to the cables for electrically energizing the resistor grid.

As shown, the resistor grid is supported by rods 67 (Figs. 5, 6 and 13), the lower ends of which rods carry laterally projecting saddle plates 69 on which rest the connecting plates 59 of the grid. These rods 67 are each suspended from the roof slabs 39 of the chamber 27 in electrically insulated relation to such slabs by a supporting and insulating structure 71. As the construction of the resistor grid and its suspension forms the subject matter of Poland United States Patent 2,472,613, dated June 7, 1949, and specifically forms no part of the present invention, it will not be further described.

The chamber 27 of the apparatus according to Figs. 1 to 15 is adapted to contain at its bottom a metal bath 73, the nature and depth of which will depend upon the operation to be performed by the apparatus as hereinafter more fully explained. As shown such bath may be entered into the chamber through a passage 75 communicating therewith adjacent its bottom and extending to the exterior of the casing 1 where it communicates with a filling trap 77 having an opening 79 into which the bath may be poured, such filling trap permitting the bath to be entered into the chamber without entrance of air into it or discharge of gas or vapors from it to the outer air. Preferably the filling trap is provided with heating means, such as a gas flame 81, for preventing the bath metal from freezing in the filling trap.

Also, as shown, the chamber 27 is provided at its end opposite the filling passage 75 with a tap hole 83 communicating with the chamber adjacent its bottom. As shown, this tap hole discharges into an overflow trap 85 at the exterior of the casing 1, such trap being provided with a pouring spout 87 for discharge of the tapped off metal into a trough 89 for leading such metal to a convenient place of disposal. By use of the overflow trap, which also is conveniently provided with heating means such as the gas flame 91 for preventing freezing of metal therein, a constant level of the bath in the chamber 27 may be maintained. However, for some operations to be performed by the apparatus the overflow trap is omitted, in which case the tap hole 83 may be normally closed by a removable plug such as a fireclay plug as shown by Fig. 23. Preferably however, when the overflow trap is provided, a tap hole 94, identical with the tap hole 83 and normally closed by a removable fireclay plug, is also provided for tapping off the bath, as indicated in Fig. 6.

As further shown, the apparatus according to Figs. 1 to 15 is provided at one end with an inlet conduit 95 for entering into the chamber 27 zinc vapors, for example, to be treated in that chamber. Also, as shown, the chamber 27 is provided at its opposite end with a discharge conduit 97 for discharging, for example, the residual vapors from that chamber. When the apparatus is employed for evaporating zinc from a zinciferous bath entered into the chamber 27 through the filling trap 77, the inlet conduit 95 may be omitted except where it is desired to employ it for entering effluent gases into the chamber as hereinafter described.

Besides providing the resistor grid hereinbefore described for radiating heat downward on the bath for heating it there is shown means for cooling the bath. As illustrated, this cooling means comprises elongated tubes 99, of mechanically strong heat refractory material such as heat refractory alloy steel, embedded in the bars 29 forming the interior bottom wall of the chamber 27, these tubes extending from one exterior side of the metallic casing 1 to its opposite side to form portions projecting from opposite sides of the casing, as best illustrated in Fig. 5. These tubes may be embedded in the bars by providing the latter with openings of slightly larger diameter than the outside diameters of the tubes and covering the tubes with plastic carbon paste and then sliding them longitudinally through such openings, with the result that when the bars are heated by energizing the resistor grid 10 the paste, which fills the interstices between the tubes and walls of such openings, will be reduced to hard carbon to form part of the bars and therefore cause the tubes to be in heat conducting contact with the bars.

As shown, each open end of the tubes 99 at the left hand side of the apparatus, as viewed in Fig. 5, is provided with a nozzle 101 for injecting a spray of water into the tube longitudinally thereof. These sprays are converted to steam by contact with the hot walls of the tubes to cool them and the bars 29 and thereby to cool the bath. The tubes at their ends opposite the spray nozzles communicate with a common manifold 103 (Figs. 5 and 14), one end of which manifold is closed, as indicated at 105, and the other end of which connects with a stack pipe 107 for conducting the steam generated in the tubes to, for example, the outer air, the manifold, as shown, being provided with a drain 109 for removing from the manifold any condensed steam or water which may collect therein.

It will be observed that by the construction of the cooling means above described the tubes 99 substantially have opposite open ends, which permits no water or condensed steam to collect therein and prevents the steam therein from being under pressure. For these reasons the construction permits the tubes to be placed in the bottom of the apparatus close to the bath without danger of leakage of water or steam from the tubes into the bath, which leakage might otherwise occur and cause violent explosions if the tubes became ruptured. Such explosions would be liable to occur if the cooling means were in the form of a water jacket consisting of tubes embedded in the bottom wall of the chamber 27, in which tubes water would be trapped and its pressure raised by heat conducted from the bath when the flow of water through the tubes is interrupted to interrupt operation of the cooling means.

As shown, the spray nozzles 101 are supplied with water through pipes 111 (Figs. 5 and 14) leading from a common manifold 113, each pipe having therein a control valve 115 for separately regulating the amount of water supplied the several nozzles. As shown, this manifold is supplied with water from a pump 117 through a pipe 119, in which pipe is placed a solenoid valve 121 for establishing and interrupting the supply of water from the pump to the manifold. The pump may be continuously driven by an electric motor, in which case it is provided with a by-pass pipe 123 connecting the discharge opening of the pump to its inlet opening as more or less schematically shown in Fig. 5, this pipe having therein a weighted valve 125 for permitting flow of water from the discharge opening of the pump back to its inlet opening. By this construction the pump is caused to supply the manifold 113 with water under constant pressure when the solenoid valve 121 is open, and the pump is permitted to operate when the solenoid valve is closed.

As more or less diagrammatically illustrated in Fig. 5, the heating means constituted by the resistor grid, and the cooling means comprising the tubes 99 and spray nozzles 101, may be automatically controlled to maintain the temperature of the bath substantially constant, or for preventing its temperature from exceeding a predetermined maximum or falling below a predetermined minimum. For this purpose there is shown extending into the bath from the exterior of the casing 1 a tube 127 of heat refractory material such as graphite, refractory alloy steel, or the like, the end of the tube at the interior of the bath having a cap 129 of like material which closes it, while contained within the tube adjacent such cap is a pair of thermocouples (not shown). From the terminals of one of these thermocouples extends, through the tube and out of its end at the exterior of the casing 1, a pair of leads 131, the potential difference impressed on such leads by the thermocouple being operable through suitable instrumentalities to establish and interrupt energization of the resistor grid. From the terminals of the other thermocouple extends in like manner a pair of leads 133, the potential difference impressed on which is operable through suitable instrumentalities to control the solenoid valve 121 for establishing and interrupting the supply of water to the nozzles 101. These instrumentalities are well known and need not be specifically described. In general they comprise relays and switches controlled by the potential difference generated by the thermocouples for effecting the desired operations, and further comprise readily adjustable manually operated means for varying the particular potential differences at which said operations will be effected, so that the bath temperatures at which the heating and cooling means are placed in and out of operation may be readily adjusted. Such instrumentalities are indicated schematically in Fig. 5 by a casing or cabinet 135 which contains those for controlling the energization of the resistor grid, and by a casing or cabinet 137 which contains those for controlling the solenoid valve.

In the wiring diagram shown by Fig. 5 the leads 131 from the thermocouple that controls the energization of the resistor grid are connected to input terminals 139 of the cabinet 135, this cabinet also having input terminals 141 which are connected by leads 143 to opposite sides 145 respectively of a power line, and further having output terminals 147 which are connected by leads 149 to the opposite terminals of the primary winding 151 of a transformer, the terminals of the secondary winding 153 of which transformer are connected by cables 155 to the opposite terminals 65, respectively, of the resistor grid. When the thermocouple from which the leads 131 extend generates a predetermined minimum potential difference due to cooling of the bath that potential difference through the relay and switch mechanisms contained in the cabinet 135 will cause the power leads 143 to be connected to the primary winding 151 of the transformer so as to energize the resistor grid for applying heat to the bath. When the potential difference generated by the same thermocouple rises to a predetermined maximum because of a rise in temperature of the bath such potential difference by means of the relay and switch mechanisms contained in the cabinet 135 will disconnect the power leads from the secondary winding of the transformer to interrupt energization of the resistor grid.

The leads 133 from the thermocouple for controlling the cooling means are diagrammatically shown by Fig. 5 as extending to the input terminals 157 on the cabinet 137, which cabinet also has terminals 159 from which extend a pair of leads 161 to the terminals 163 of the energizing winding of the solenoid valve 121, the cabinet further having input terminals 165 to which are connected the opposite sides 145 of the power line. When the potential difference generated by this thermocouple rises to a predetermined value because of a rise in temperature of the bath that potential difference through suitable relay and switch mechanisms contained in the cabinet 137 will connect the opposite sides 145 of the power line to the leads 161 for energizing the winding of the solenoid valve for causing that valve to open and supply water to the spray nozzles 101. Similarly, when the potential difference generated by this same thermocouple falls to a predetermined value due to the cooling of the bath, the relay and switch mechanisms contained in the cabinet 137 will disconnect the leads 161 from the opposite sides 145 of the power line so as to deenergize the winding of the solenoid valve and cause that valve to close and interrupt the supply of water to the nozzles 101, the solenoid valve conveniently being of the type which is biased toward closed position so that it will automatically close when its winding is deenergized.

The above described automatic control for the heating and cooling means for the bath may be so designed that the cooling means is placed in operation substantially when the heating means is placed out of operation, and vice versa. It has been found that in this way a close control of the bath temperature may be maintained, say within a range of 5 to 10 degrees when the bath is at about 1400 to 2000° F., which for all practical purposes results in the bath being maintained at a constant temperature.

It will be understood, however, that when the apparatus is used for condensing zinc vapors, the heating means in some instances may be omitted and, in other instances, even also the cooling means, in which latter instances the walls of the condensing chamber 27 may be of light construction to permit sufficient heat to radiate from the chamber to effect the condensing operation. However, the cooling means is preferably provided, when such condensing operation is being performed, so as to insure not having the temperature exceed such value as will result in inefficient operation, and also preferably in performing such condensing operation both the heating and cooling means are provided if it is desired to maintain the temperature constant or within predetermined limits as best insuring the kind of condensing operation that is desired. When the apparatus is employed for evaporating zinc from a bath of zinciferous material the cooling means may in some instances be omitted. However, both the cooling means and the heating means are also preferably employed in such evaporating operation when it is desired to have the evaporated metallic vapors discharge from the chamber 27 at some desired temperature or within some desired range of temperatures.

Extending through the chamber 27 and a pair of its opposite lateral walls is shown a rotor supporting and driving shaft 167, which shaft is of heat refractory material, preferably graphite, and projects at opposite ends from the casing 1 where it is rotatably supported in bearings 169 detachably carried by frames 171 mounted at opposite sides of the casing on the foundation for the apparatus. The portions of the shaft in these bearings may be provided with metal wear sleeves 173 (Fig. 3) fixedly secured to the shaft by dowels 175. However, if it is desired to minimize the amount of heat conducted to the bearings, the shaft at each of its opposite ends may, as shown by Fig. 15, be removably rigidly connected by a coupling 176 to a metal shaft extension 177 which runs in the adjacent bearing, this coupling comprising a thick intermediate disk-like body 178 of heat refractory heat insulating material. For rotating the shaft 167, outwardly of the bearing 169 at the right hand side of the apparatus as viewed in Fig. 5 the shaft is shown as fixedly carrying a pulley 179 which is connected by a belt 180 to a pulley 181 driven by an electric motor 183, the motor being carried by a bracket 185 secured to the adjacent side of the casing 1.

The rotor 186 illustrated comprises a pair of disk-like members 187 within the chamber 27, each of which members is carried by the shaft 167 in closely spaced relation to those slabs 35 through which the shaft extends, such members being of heat refractory material, preferably graphite. For securing the disk-like members to the shaft for rotation therewith each is screw-threaded, as shown at 189 (Fig. 3), on the body portion 191 of a hub 192 having a radially extending flange 193, against which flange the inner side of the disk-like member bears, the hub also being preferably of graphite. After the hubs are screw-threaded into the disk-like members in assembling the apparatus, the hubs are non-rotatably secured in fixed relation to the shaft, for example, by graphite dowels 195, as shown in Fig. 3. Preferably the pitch of the cooperating screw-threads on the hubs and disk-like members is such that any resistance opposing rotation of the disk-like members tends to screw them against the adjacent sides of the flanges 193 of the hubs when the latter are so secured to the shaft.

As best shown in Figs. 5 to 11, extending from one disk-like member 187 to the other and supported thereby are bars 197 and 199 of heat refractory material, preferably graphite. Each bar 197, which as shown is generally E-shaped in cross-section with its sides forming the height of such E extending approximately radially of the shaft 167, is formed, preferably by a milling operation, on one of such sides with longitudinally extending spaced grooves 201 and 203 which give the bar its E-shaped cross-section and cause it to present an inner flange-like leg 205, an outer flange-like leg 207, and an intermediate flange-like leg 209, the leg 207 as shown being of greater height than the leg 205 and the leg 209 being of height intermediate the heights of the legs 205 and 207. As further shown, the side of the leg 209 adjacent the groove 201 is beveled at its outer end portion as indicated at 211. The bar 199, which as shown is of rectangular cross-section, is so positioned that its longitudinally extending side or edge 213 (Fig. 8) abuts against the longitudinally extending edge 215 at the outer end of the flange-like leg 209 of the bar 197 so as to form in conjunction with the beveled surface 211 on said leg 209 a notch 217 (Fig. 8) extending longitudinally of the two bars.

As illustrated, for supporting the bars 197 and 199 each disk-like member is formed, preferably by a milling operation, with a series of angularly spaced recesses 219 which receive the end portions of those bars. These recesses (see Figs. 9 and 12) are shown as extending inwardly from the periphery of the disk-like member and are of relatively shallow depth. As will be clear from Figs. 8 to 12, the recesses are so shaped that their lateral sides contact with the flat side portions 221, 223 and 225 of the bar 197 and with the flat sides 227, 229 and 231 of the bar 199, the leg 209 of the bar 197 because it abuts with the flat side 213 of the bar 199 holding the latter in that portion 233 of the recess which receives the bar 199. For holding the bars 197 in the recesses 219 there are fitted into those portions of the recesses which are radially outward of said bars insert blocks 235, which blocks abut with the outer flat sides 237 of the bars and are doweled to the disk-like members 187 as indicated at 239. These insert blocks and dowels are preferably formed of graphite.

The bars 197 and 199 may be assembled with the disk-like members 187 when the walls within the casing 1 are built up to about the tops of the disk-like members. The holes in the shaft which receive the dowels 195 for securing the hubs 191, 193 to the shaft may be drilled, before all the bars are assembled with the disk-like members, by "spotting" such holes with the corresponding holes in the hubs, which last mentioned holes may be drilled before the hubs are assembled on the shaft. Any of the sets of bars 197, 199 may be removed from the disk-like members 187 by breaking out the insert blocks 235 associated with such set after drilling out the dowels 239 which secure those insert blocks to the disk-like members. Such removal of the set of bars will permit replacement of such set, and such removal of a set opposite the dowels 195 which secure the hubs 192 to the rotor shaft will give access to those dowels and permit them to be drilled out of the holes which receive them, in this way to permit the hubs to be screwed out of the disk-like members 187 if it is desired to remove the shaft. Also, in assembling the bars 197 and 199, and in assembling the insert blocks 235 and dowels 239 with the disk-like members, the contacting surfaces of such parts may be coated with carbon paste and the blank spaces in the recesses 219 be filled with carbon paste, with the result that when the rotor is heated by energization of the resistors such paste will be reduced to hard carbon so as to form a rigid connection between such parts.

The baffle bar 43, hereinbefore referred to, as shown by Fig. 6 is formed at each opposite lateral sides thereof adjacent its upper surface with longitudinally extending notches 241 for receiving the adjacent edge portions of the slabs 41 at each of opposite sides thereof, and, as shown by Fig. 5, is formed at each of opposite ends adjacent its upper surface with transversely extending notches 243 which provide projections 245 resting on the upper edges of the slabs 35. Further, each of its opposite end portions is notched, as shown at 247 (Fig. 5), for receiving the peripheral portions of the disk-like members 187 of the rotor 186. The under side of the baffle bar throughout its entire extent between the notches 247 is transversely of arcuate shape to provide a surface 249 (Fig. 6) in closely spaced relation to the radially outward surfaces of the E-shaped bars 197 of the rotor, the transverse width of this surface being preferably such that at least two such E-shaped bars are beneath it at all times.

Where conditions permit, the lower portion of the drum is submerged in the bath preferably to such depth that the buoyancy of the rotor in the bath place a minimum of load on the shaft 167 and its bearings. In any event the rotor is submerged in the bath to such depth as will submerge at least one of the E-shaped bars 197 completely in the bath. The submergence of the lower portion of the rotor in the bath, and the coaction of the baffle bar 43 with the rotor, act to divide the vapor space of the chamber 27 above the bath operatively into two compartments, one at the right hand side of the rotor as viewed in Fig. 6 and the other at its left hand side as so viewed, so that the vapors or mixture of vapors and gases in such right hand compartment must, in their passage to the discharge conduit 97 of the chamber, flow through the spaces between the bars at the right hand side of the longitudinally extending vertical center plane of the rotor into the interior of the rotor and from there through the spaces between the bars at the left hand side of such plane into the left hand compartment, with which latter the discharge conduit 97 of the chamber 27 communicates.

The operation of the rotor on the bath can perhaps be best gained from Fig. 8. In that figure the upper surface level of the bath is indicated at 251. When the rotor is rotated in the direction of the arrow shown by that figure those buckets which are formed by the grooves 203 in the E-shaped bars 197 and adjacent sides of the legs or flanges 205 and 209 of such bars and adjacent sides 231 of the bars 199 scoop up a body 253 of the bath liquid, and, as each of such buckets travels upwardly, such liquid progressively pours over the longitudinally extending corner 255 of the bar 197 as is indicated by the diminishing size of the bodies 253 in the buckets as the series of buckets at the left hand side of the vertical longitudinal medial plane of the rotor extend upwardly, until when each bucket moves to its uppermost position that bucket is empty. In this way the scooped up bath liquid so poured acts to form at the left hand side of said plane as viewed in Fig. 8 spaced downwardly descending curtains of the bath liquid in the interior of the rotor extending longitudinally thereof.

Still referring to Fig. 8, the buckets formed at the exterior of the rotor by the grooves 201 in the E-shaped bars 197 and adjacent surfaces of the legs or flanges 207 and 209 of those bars scoop from the bath bodies 257 of bath liquid. The bars 199 prevent this scooped up liquid from pouring from these buckets until they about reach their uppermost position of rotation as clearly indicated in Fig. 8, whereupon the scooped up liquid begins to pour from the bucket over the longitudinally extending outer flat side 227 and longitudinally extending corner 259 of the bar 199 to enter the interior of the rotor through the spaces betwen the bars progressively to empty each bucket as its movement is continued to approximately the horizontal medial plane of the rotor. The notches 217 formed by the beveled surfaces 211 of the flanges or legs 209 of the bars 197 and adjacent sides of the bars 199 act to trap liquid in these buckets in such way as to delay complete emptying of the buckets as they pass over their uppermost position as viewed in Fig 8 and then downwardly. The bath liquid so poured from these buckets acts to form in the interior of the rotor spaced downwardly descending curtains of the bath liquid at the right hand side of the vertical longitudinal medial plane of the rotor as viewed in Fig. 8, such curtains extending longitudinally of the rotor.

In the above ways the buckets at the exterior and interior of the rotor act to form spaced continuously renewed downwardly descending curtains of the bath liquid entirely across the interior of the drum, these curtains being transverse to the direction of the flow of metallic vapors, or mixture of effluent gases and metallic vapors, flowing transversely across the interior of the drum.

When the above described apparatus is used, for example, as a zinc condenser, the zinc vapors are forced to impinge on the wet surfaces presented by the above described curtains, which curtains when the apparatus is so used normally would be of molten zinc. This gives an extremely effective condensation of the zinc vapors, and, as there is no tendency finely to divide the zinc of the curtains when the vapors break through them, any tendency to form physical and chemical blue powder is reduced to a minimum. Any blue powder which might be formed would float on the zinc bath, and the bars 197 as they enter the bath would tend to push such powder beneath the surface of the bath to cause it to coalesce with the bath. Further, any condensed metallic droplets which fail to coalesce with the zinc of the curtain first contacted by the metallic vapors tend to be caught by the curtains subsequently contacted by the vapors and mix with them and descend into the bath, which further reduces the amount of blue powder that might otherwise tend to be produced.

When the rotor above described is formed of graphite, which is preferably the case, it constitutes a good conductor of heat, and therefore acts to conduct heat from the bath to the vapors above the bath or heat from such vapors to the bath depending upon the relative temperatures of the bath and vapors. Consequently by controlling the temperature of the bath the rotor acts in conjunction with the bath and above described curtains to control the temperatures of the vapors leaving the vapor space above the bath.

When the above described apparatus is used for evaporating zinc from a zinciferous bath much the same thing occurs as described in the preceding paragraph, the curtains of bath metal exposing a large surface from which evaporation may occur, and causing the metal vapors or mixture of the same and effluent gases, which are forced to flow through the rotor toward the vapor exit from the vapor space, to become saturated with the evaporated zinc and other metallic vapors at the temperature of the bath, so that by maintaining the bath at a desired temperature the composition of the vapors discharging from the vapor space may be regulated as hereinafter more fully described.

The rotor is rotated at such speed as will not to any significant extent throw the liquid bath metal from the buckets by centrifugal action or give the metal as it is poured from the buckets any substantial component of motion in a horizontal direction. Such speed of rotation is not critical. In practice the linear speed at which the buckets move may be that corresponding to their linear speed when they are positioned about 12 inches from the center of the rotor shaft with that shaft rotating at about 15 revolutions per minute, which is a linear speed of about that of a person walking at the rate of one-half mile per hour.

As will be obvious, the rotor shaft 167 must extend through the walls of the chamber 27 in a substantially fluid tight manner. It has been found, however, that zinc in the vapor state tends to leak around the shaft into the holes in such walls which receive the shaft, and to condense there and form zinc oxide, and likewise that liquid zinc, which under some conditions may trickle down the walls of the chamber 27 of the apparatus, also tends to leak around the shaft into such holes and there form zinc oxide. In these cases the zinc oxide formed tends to bind the shaft to the walls of such holes. To avoid this action, each of those portions of the shaft which extends through the walls of the chamber 27 is shown as surrounded by a sleeve 261 (Fig. 3), preferably of graphite, tightly fitting the shaft and non-rotatably secured thereto by a dowel or the like 263, the joint between the shaft and the sleeve being rendered fluid tight by coating them with carbon paste prior to sliding the sleeve over the shaft, which paste, as hereinbefore explained, will be reduced by the temperature of the heated walls to solid carbon. Each sleeve 261 at its inner end is shown as formed with a portion 265 which exteriorly thereof is frusto-conical, each sleeve being rotatably mounted in the cylindrical bore 267 of a block 269 likewise preferably formed of graphite, this bore having a frusto-conical surface portion 271 against which rotatably bears the frusto-conical end portion of the sleeve 261. It has been found that such frusto-conical portions act to minimize the entrance of zinc vapors and liquid zinc between the bearing surfaces presented by the cylindrical surface portion of the bore 267 and the cylindrical exterior surface portion of the sleeve 261, which sleeve in effect is part of the shaft. As shown, the bore 267 is provided with an annular enlargement or groove 273 preferably positioned at such point where the temperature is low enough to condense and keep liquid any vaporous zinc which may unavoidably leak from the chamber 27 past the frusto-conical end portion of the sleeve. In this way the groove will tend to trap such condensed zinc and also any condensed zinc which may trickle down the adjacent interior wall surface of the chamber 27 and past the frusto-conical end surface 271 of the sleeve. Connecting the lower portion of the groove with the interior of the chamber 27 at a point therein below the shaft is shown a passage 275, formed in the block 269 and adjacent slab 35, for draining back to the chamber 27 the liquid zinc which may collect in the groove.

The block 269 preferably is exteriorly square in cross-section, as best shown by Fig. 4, so that the adjacent walls of the chamber 27 may readily be built around it. As shown, the block is formed at its inner end with a projection 277, which exteriorly thereof is preferably of square cross-section and fits within an opening 279 of like cross-section in the adjacent slab 35, the shoulder 281 at the base of this projection bearing against the outer side of the slab 35 to restrain the block 269 from inward movement from its position shown by Fig. 3. The block may be retained in position by a ring-like metal plate 283 secured by bolts 285 to the exterior of the adjacent wall of the metallic casing 1.

For minimizing heat losses by conduction through the graphite block 269 and graphite sleeve 261, the shaft is shown as extending through a pan-like casing 287 removably secured to the exterior side of the metallic casing 1, this pan extending over the adjacent end portions of the block and sleeve and having a filling orifice 289 for filling the pan with a body 291 of heat refractory heat insulating material such as lampblack.

For further preventing the possibility of zinc which may trickle down the inner walls of the condensing chamber from entering between the cooperating bearing surfaces of the blocks 269 and sleeves 261 the present apparatus is shown as provided with guard bars 293 (Figs. 6 and 7) which are of arcuate extent and are in closely spaced relation to the peripheries of the disk-like members 187 of the rotor. Each of these bars at one of its ends is shown as abutting the adjacent side of the baffle bar 43 and as resting against and secured to the adjacent slab 35 by bolts 295 extending through said slabs and tapped into the bars. The bars overhang the peripheral edge surfaces of the rotor disks 187 and have downwardly inclined upper surfaces 297 for deflecting any condensed zinc which may collect on and trickle down the walls of the adjacent slabs 35, so as to prevent such zinc from entering the space between said disks and slabs. Furthermore, the close spacing between the bars and peripheral edge surfaces of the disks also acts to prevent flow of vapors into the spaces between the disks and slabs, from which aspect if desired said bars may be continued about the disks to those portions thereof which are adjacent the upper level of the bath.

It will be understood that the apparatus hereinbefore described may be so constructed that the chamber containing the bath may, instead of having one rotor positioned therein, have two or more rotors. For example, as more or less diagrammatically shown by Fig. 22, such chamber contains two rotors positioned in horizontal laterally spaced relation, the construction of the apparatus otherwise being identical with that shown by Figs. 1 to 15 except that the chamber 27 is longer so as to accommodate two rotors. In the apparatus according to Fig. 22 the metallic vapors or gases, or mixture of the two, entering the chamber 27 through the inlet conduit 95 must pass through the two rotors in series to reach the discharge conduit 97. The apparatus according to Fig. 22 is particularly adapted to condensers of large capacity and to evaporating zinc from a zinciferous bath, in which latter case, as hereinbefore explained, the inlet conduit 95 may under certain conditions of operation be omitted.

Where economic conditions render it desirable, forms of heating means other than electric resistors may be employed for heating the bath. For example, in the apparatus more or less schematically and diagrammatically shown by Fig. 16, firetubes may be employed.

As shown in Fig. 16, a row of firetubes 299 is substituted for the row of resistors 57 of the form of apparatus hereinbefore described, the construction of the apparatus and the cooling means being otherwise as hereinbefore described. These firetubes, which may be formed of suitable heat refractory material, such as graphite or heat refractory alloy steel, extend, like the cooling tubes 99 hereinbefore described, entirely through the chamber 27 and project from the metallic casing 1 at each of its opposite sides. The tubes 299 at their ends projecting from one side of the casing communicate, like the tubes 99, with a common manifold, such manifold with which the tubes 299 communicate being indicated at 301, and this manifold, like the manifold 103, at one end communicates with a stack, such stack to which the manifold 301 is connected being indicated at 303.

Each of the firetubes 299 of Fig. 16 at its end opposite the manifold 301 is, as shown, provided with a gas burner of known kind having a nozzle 305 for mixing air and fuel gas supplied it and projecting such combustible mixture into the tube. This mixture when it is initially discharged from the nozzle may be ignited in any convenient way, as by a pilot light or electric spark. As shown, an electric spark is employed for this purpose, each tube being provided with an ignition electrode 307, which electrode is carried by the tube in a known manner in insulated relation thereto and is connected by a lead 309 to a bus-bar 311. The bus-bar, when the mixture is to be ignited, is temporarily connected to a source of high tension electric current to cause an ignition spark between the electrode 307 and a second and grounded electrode 313 carried by the tube, the leads 309 for all the electrodes 307 being connected to this bus-bar.

As also shown, the nozzle 305 for each tube 299 of Fig. 16 is connected by a gas supply pipe 315 to a common manifold 317, which manifold is in turn connected to a source of gas under pressure by a pipe 319 having therein a solenoid valve 321 for establishing and interrupting a supply of gas to that manifold. Similarly, the nozzle for each tube is connected by an air supply pipe 323 to a common manifold 325, which manifold is in turn connected to a source of compressed air supply by a pipe 327 having therein a solenoid valve 329 for establishing and interrupting a supply of air to said manifold 325.

The above described heating means of the apparatus according to Fig. 16, like the heating means of the apparatus according to Figs. 1 to 15 and 22, may be controlled by one of the two thermocouples in the tube 127, the pair of leads 131 from that thermocouple being connected to the input terminals 139 of the cabinet 135 which houses the relay and switch mechanisms for controlling the heating means. The power line 145, which is connected by leads 331 to the terminals 141 on the cabinet, is adapted to be connected by the relay and switch mechanisms housed by the cabinet to the terminals 147 on the cabinet when the potential difference generated by the thermocouple falls to a predetermined value and to be disconnected from them when that potential difference rises to a predetermined value in response to changes in the temperature of the bath. In the case of the apparatus according to Fig. 16, however, the terminals 147, instead of being connected as heretofore to the primary winding of the transformer which energizes the resistors, is connected by leads 333 to the terminals 335 of the solenoid winding of the solenoid valve 321, and is connected by leads 337 branching from the leads 333 to corresponding terminals 335 of the energizing winding of the solenoid valve 329, so that when the terminals 147 are connected to the power line because of a fall in temperature of the bath to a predetermined value both solenoid valves 321 and 329 will open to establish a supply of gas and air to the nozzles 305, and so that when the terminals 147 are disconnected from the power line because of a rise of the bath temperature to a predetermined value both such valves will close to interrupt the supplies of gas and air to the nozzles. The cabinet 135 of Fig. 16 also houses means energized by the power line for temporarily creating a high tension current simultaneously with the power line being connected to the terminals 147 on the cabinet. This current creating means has an output terminal 339 on the cabinet, which terminal is connected by a lead 341 to the bus-bar 311, so that simultaneously with the establishment of the supplies of gas and air to the nozzles 305 an ignition spark will be temporarily created for igniting the combustible mixture projected from those nozzles. The cooling means of Fig. 16 comprising the tubes 99 may be controlled by the other thermocouple at the end of the tube 127 in the same way as hereinbefore described in connection with Fig. 5, the power line 145 being connected by the leads 331 to the power input terminals 165 on the cabinet 137 which houses the relay and switch mechanisms for controlling the solenoid valve 121 which establishes and interrupts the supply of water to the manifold 113, to which manifold the pipes 111 are connected for conducting water to the spray nozzles 101.

The apparatus more or less diagrammatically illustrated by Figs. 17 and 18 is structurally identical with that shown by Figs. 1 to 15 except that, like the apparatus according to Fig. 16, firetubes are substituted for the resistors of the apparatus according to Figs. 1 to 15 and those firetubes as well as the cooling tubes 99 are positioned in the bottom wall of the chamber 27. As shown in Fig. 17, in the bottom wall of the chamber 27 is an upper course of elongated bars 343 resting on a lower course of elongated bars 345, the bars of both courses being similar to the bars 29 of the apparatus according to Figs. 1 to 15. The firetubes 299, which are identical with those shown by Fig. 16, are embedded in the bars 343 of the upper course of bars, while the cooling tubes 99, which are identical with those of the apparatus according to Figs. 1 to 15, are embedded in the bars 345 of the lower course, the tubes in all instances projecting from opposite sides of the metallic casing 1 of the apparatus the same as the corresponding tubes shown in Figs. 5 and 16. The bars 343 and 345 may be of the same material as the bars 29 of the apparatus according to Figs. 1 to 15, and the tubes may be caused to be embedded in them in the same way as the tubes 99 are embedded in the bars 29. As diagrammatically illustrated in Fig. 18, the cooling tubes 99, like those of Fig. 5, are each connected at one end to a common manifold 103 at the exterior of the metallic casing 1, which manifold, like the manifold 103 of Fig. 5, is connected to a stack pipe 107. At their opposite ends the tubes 99, as hereinbefore described, are each provided with a water spray nozzle 101, these nozzles, as hereinbefore, being connected by pipes 111 to a common manifold 113, which latter is supplied with water under pressure by a pipe 119 in which is placed a solenoid valve 121 for establishing and interrupting the supply of water to the manifold 113.

Similarly, as diagrammatically shown by Fig. 18, the firetubes 299 at one of their ends all communicate with a common manifold 301, as described in connection with Fig. 16, which manifold discharges into a stack 303. At their opposite ends the firetubes 299, as described in connection with Fig. 16, are provided with burner nozzles 305, each of which nozzles is supplied with fuel gas under pressure by a pipe 315. These pipes 315, as also described in connection with Fig. 16, are all connected to a common manifold 317, which manifold is supplied with the gas by a pipe 319, in which pipe is placed a solenoid valve 321 for establishing and interrupting the supply of gas to the manifold. Also each burner nozzle 305, as described in connection with Fig. 16, is supplied with air under pressure through a pipe 323, all of which pipes are connected to a common manifold 325, this manifold being connected to a source of compressed air supply by a pipe 327, in which last mentioned pipe is placed a solenoid valve 329 for establishing and interrupting the supply of air to the manifold 325. The supplies of air and gas to the burner nozzles 305, and the supply of water to the spray nozzles 101, in the apparatus according to Figs. 17 and 18 are controlled by the two thermocouples at that end of the tube 127 which is immersed in the bath, in the same way as described in connection with the form of apparatus shown by Fig. 16.

The form of apparatus more or less diagrammatically shown by Fig. 19 is like that shown by Figs. 1 to 15 except that the heating resistors are omitted and the bath is heated by gas flames beneath the metallic casing 1. For producing these gas flames there is positioned beneath the casing 1 a plurality of spaced rows of burner nozzles 347, of a known kind, adapted to be supplied with gas and air under pressure. These rows of nozzles are carried by spaced gas supply pipes which extend transversely across the casing 1 beneath it, one of which pipes is shown at 349. These pipes are each closed at one end, and at their opposite ends are all connected to a common manifold 351 adapted to be supplied with gas under pressure by a pipe 353 connected to it, in which pipe 353 is placed a solenoid valve 355 for establishing and interrupting the supply of gas to the manifold. Beneath each pipe 349 is positioned an air suppply pipe 357 which is connected by the pipes 359 to each nozzle 347 of the row of such nozzles carried by the pipe 349, so as to supply those nozzles with air under pressure for mixture with the gas supplied the nozzles by said pipe 349. The pipes 357 are each closed at one end, and at their opposite ends are each connected to a common air supply manifold 361 which is supplied with air under pressure by a pipe 363 in which is placed a solenoid valve 365 for establishing and interrupting the supply of air to said manifold. The supply of water to the water spray nozzles 101 for the tubes 99, as hereinbefore described, is established and interrupted by a solenoid valve 121 in the pipe 119 connected to the discharge outlet of a water pump.

The solenoid valves 355 and 365 of Fig. 19, for establishing and interrupting the supply of gas and air, respectively, to the burner nozzles 347, may be controlled by one of the thermocouples at that end of the tube 127 which is immersed in the bath, and likewise the solenoid valve 121 for establishing and interrupting the supply of water to the spray nozzles 101 may be controlled by the other thermocouple at that end of the tube, in each instance in the same way as the solenoid valves for effecting similar results are controlled in the apparatus according to Fig. 16. As described in connection with Fig. 16, pilot lights or ignition spark electrodes (not shown in Figs. 17 and 18) may be associated with each of the burner nozzles 347 for igniting the mixture discharged therefrom when the solenoid valves controlling the air and gas supplies to such nozzles are opened.

In the forms of apparatus hereinbefore described electric heating means other than resistors may be employed for heating the bath. For example, the bath may be heated by inducing therein electric currents, as more or less diagrammatically and schematically shown by Figs. 20 and 21. That portion of the apparatus shown by these figures which is above the bottom wall 11 of the metallic casing 1 may be identical with that of the apparatus according to Figs. 1 to 15 except that the resistor grid is omitted. As shown, the casing 1 is held in elevated position by supports 367, the supports 369 for the rotor shaft bearings 169 being like the supports 171 of Figs. 1 and 5 except that they are of correspondingly greater height. The bottom wall 11 of the metallic casing 1 adjacent one of its side walls is shown as cut away to form an elongated opening 371 and, at the edges of this opening, has secured thereto in a fluid tight manner the peripheral flange 373 of a casing 375. The casing 375 has the opposite pairs of side walls 377 and 379 and a bottom wall 381 integral with said side walls at their lower edges, the peripheral flange 373 being integral with said side walls at their upper edges, which side walls are integral with each other. Within the casing 375 is a body 383, of heat refractory material, the upper surface of which is contiguous with the bottom surface of the heat refractory material within the metallic casing 1. As shown, in the bottom wall of the chamber 27 and the contiguous portion of the heat refractory body 383 in the casing 375 is formed a slot 385, the slot having an open upper side communicating with the body 73 of bath liquid in the chamber 27. In the lower portion of the body 383 is formed a horizontal passage 387 parallel to and approximately coextensive in length with the slot 385. As shown, the end portions of the slot 385 and passage 387 are placed in communication with each other by vertical passages 389, while at the center portions of their lengths they are placed in communication by a vertical passage 391. Those two portions 393 of the body 383 which are surrounded by these passages and slot 385 are, as shown, each formed with a passage 395 transverse to the slot 385 and passage 389, which passage 395 at opposite ends opens on the exterior of the two casing side walls 377. Extending through each of these passages 395 is shown a tube 397 which has open end portions projecting beyond the casing side walls 377, the tube being supported by brackets 399 carried by said side walls. Carried by each of these tubes 397 in insulated relation thereto approximately midway the length of the passage 395 is an electro-magnetic field winding 401. As shown, each of the two tubes 397 and the passage 395 at one of their ends open into a box-like compartment 403 carried by the adjacent side wall 377 of the casing 375, this compartment being closed except that one end wall 405 thereof is provided with an opening 407 connected to an exhaust fan 409 having its discharge opening at 411. This exhaust fan acts to draw air through the tubes 397 and passages 395 for cooling the windings 401.

In the apparatus according to Figs. 20 and 21 each of the opposite ends of the two field windings 401 is connected to a lead wire or cable 413 diagrammatically shown in Figs. 20 and 21, these leads in practice extending from the exterior of the casing 375 through the passages 395 or tubes 397, as, for example, indicated in Fig. 20, through the tubes and openings 415 therein, to the end terminals of said windings. By means of these leads the two windings may be connected in parallel to a low frequency source, say 60 cycles, of electric current for energizing them. When the windings are so energized they produce an alternating magnetic field which extends into the horizontally extending slot 385 and passage 387, and into the vertical passages 389 and 391 connecting said slot and passage 387, so as to induce, in the portions of the bath liquid filling said slot and passages, electric eddy currents which heat such portions of the bath. As these fields and eddy currents induced by them are of greater intensity adjacent those vertical sides 417 of the vertical passages which are nearest the windings than at points in said passages more remote from said windings the bath liquid in the vertical passages 389 and 391 is more strongly heated adjacent said sides than elsewhere in said passages, thus causing the portions of the bath liquid adjacent said sides to flow upwardly by convection and the portions thereof more remote from said sides to flow downwardly. Such flowing of the bath liquid in the vertical passages causes a flow of the bath liquid in those portions of the horizontal passage 387 which are beneath the lower sides 418 of the two refractory portions 393 that surround the windings, that flow being in opposite directions away from the vertical longitudinal medial planes of such portions 393 toward the vertical passages 389 and 391, and in opposite directions along the bottom of the passage 387 from said passages 389 and 391 toward said planes. The bath liquid which flows through the passage 387 along its upper side toward the vertical passages joins the upwardly ascending currents of bath liquid in said vertical passages, while the downwardly flowing bath liquid in said vertical passages joins the bath liquid flowing along the bottom of said passage 387 toward the just mentioned vertical medial planes, so that there is a continuously circulating stream of the bath liquid to and from the body of the bath in the chamber 27, all portions of which stream while in these vertical and horizontal passages being heated by the alternating field as the stream so circulates. The bath liquid in the slot 385 adjacent the upper horizontal sides 420 of the portions 393 of the refractory material surrounding the windings is more strongly heated than the portions of the bath liquid in said slot more remote from said sides, which causes a circulation of the bath liquid in said slots to and away from the body of the bath liquid in the chamber 27, which also acts to heat said body.

In the apparatus according to Figs. 20 and 21 the cooling tubes 99 of the modification of the invention shown by Figs. 1 to 15 also may be employed, as indicated in Fig. 20. As schematically illustrated in Fig. 21, the supply of water to the spray nozzles 101 associated with these tubes may be controlled by one of the thermocouples in the submerged end of the tube 127 in exactly the same way as described in connection with Fig. 5, which description need not be repeated. The leads 413, hereinbefore referred to, for energizing the windings 401 of Figs. 20 and 21, as schematically indicated in Fig. 21, extend to the terminals 419 on a cabinet 421, which cabinet also has terminals 423 to which are connected the opposite leads 425 of the low frequency line for energizing such windings, and has a further pair of terminals 427 to which are connected the leads 131 of the other thermocouple in the tube 127. The cabinet 421 houses suitable relay and switch mechanisms, controlled by the potential difference impressed on the leads 131 by the thermocouple to which those leads are connected, the readily adjustable means mentioned in connection with the wiring diagram of Fig. 5 also being provided for selecting the predetermined bath temperature at which these mechanisms will be operated. The mechanisms so controlled connect the terminals 423 to the terminals 419 when the temperature of the bath drops to a predetermined value, in that way to energize the windings 401 and thereby heat the bath, and, when the temperature of the bath rises to a predetermined value, to interrupt such connection for deenergizing the coils and thereby interrupting the heating of the bath. The heating and cooling means of Figs. 20 and 21 preferably are so controlled by the two thermocouples that substantially immediately upon the heating means being placed out of operation the cooling means is placed in operation, and vice versa, so as to control the temperature of the bath within narrow limits.

In Fig. 23 is more or less diagrammatically shown an arrangement of apparatus for purifying zinc, such apparatus utilizing units hereinbefore described. As shown, a unit 429, which may be like that shown by Fig. 22, is employed for evaporating zinc from a bath 431 of zinc contaminated with lead, which bath is entered into the unit through its filling trap 77. The vapor discharge conduit 433 of the unit 429 is shown as connected to the vapor space of a second unit 435, which latter may be identical with that shown by Figs. 1 to 15, for condensing the zinc vapors discharged from the unit 429.

The condensing unit 435 of Fig. 23 contains a bath 437 of zinc entered into it through its filling trap 77, which bath is maintained at a constant level by the overflow trap 85 of the unit. The discharge conduit 439 from the unit 435 is shown as connected by a conduit 441 to an inlet opening 443 communicating with that end of the vapor space of the evaporating unit 429 which is opposite its end communicating with the discharge conduit 433. Communicating with the conduit 441 is shown a pipe 445 having therein a control valve 447 for supplying the conduit with controlled amounts of nitrogen or other inert gas. In the conduit 441, between the point of communication therewith of the pipe 445 and the inlet opening 443 to the vapor space of the evaporating unit 429, are interposed a blower 449 for cycling the nitrogen through the two units and a heater 451 for reheating the gases so cycled. The flow of these gases through the units acts to carry the metal vapors evaporated from the bath in the unit 429 through that unit to the condensing unit 435, and also through the latter while the metal vapors are being condensed therein.

The bath in the evaporating unit 429 as it becomes deplenished with respect to zinc, as hereinafter more fully explained, may be tapped off through the tap hole 83 of that unit to be received by the associated trough 89 for leading the tapped off metal to a convenient place of disposal for subsequent treatment hereinafter described. The zinc condensed in the unit 435 and continuously overflowing therefrom through the discharge trap 85 may be led by the associated trough 89 to any convenient place of disposal, for example, molds for forming zinc slabs.

The impure molten zinc entered into the evaporating unit 429 may be derived from any source, for example, may be remelted zinc condensed from the vaporous zinc discharged from any sort of zinc smelter, which zinc in such example commonly would contain an amount of lead depending upon the nature of the zinc ore concentrate being smelted and ordinarily would be not less than about 2%. Similarly, as another example, the remelted zinc may be so-called "Prime Western Zinc" which contains a maximum of about 1.3% lead. By reason of the heat applied to the bath in the unit both zinc and lead will be evaporated from the bath, this evaporating action being accelerated by the action of the rotors in raining bath metal through the vapor space of the unit. The unit is so designed that the temperature of the vapors and gases discharging from it will be at substantially the temperature at which the bath is maintained, the mixture of vapors and gases being substantially saturated with zinc and lead so that the partial vapor pressure of each is substantially equal to the saturated vapor pressure of each at the temperature of the bath. It will be understood that at atmospheric pressure zinc boils at approximately 1667° F., the saturated vapor pressure at that temperature being 760 mm. At such temperature the saturated vapor pressure of lead is however only about 0.4 mm. The molecular ratio of lead to zinc in the mixture being discharged from the unit is directly proportional to both the molecular ratio of lead to zinc in the bath and the ratio of the partial vapor pressures of lead and zinc in such mixture. The saturated vapor pressure of lead falls off much more sharply than that of zinc as the temperature is decreased below 1667° F., the boiling point of zinc at atmospheric pressure, and, to take advantage of this in securing a low percentage by weight of lead in the mixture discharged from the unit, applicant maintains in the unit a bath temperature of less than 1667° F., say about 1500 to 1600° F. Maintaining this lower bath temperature secures a lower ratio of the partial vapor pressures of lead and zinc in the mixture being discharged, and consequently less lead in proportion to the zinc contained in the mixture, these partial vapor pressures, because the mixture is saturated with zinc and lead, corresponding to their saturated vapor pressures at such lower temperature of the bath, the total vapor pressure of the mixture equaling the sum of the partial vapor pressures of zinc and lead and that attributable to the effluent gases contained in the mixture. In this way applicant is able to obtain zinc of well over 99% purity in respect to lead in the mixture discharged from the evaporating unit.

The above mentioned purity of the zinc, with respect to lead, contained in the mixture discharged from the evaporating unit 429 may be further increased by tapping off all or part of the bath before it becomes saturated with lead, and adding a corresponding amount of fresh bath so as to have the unit always contain a bath in which the amount of lead is below such saturation point. Such increase in the purity of the zinc results because the molecular ratio of lead to zinc in the mixture being discharged from the unit when such mixture is saturated with zinc and lead is directly proportional, among other factors, to the percentage of lead to zinc in the bath as above explained. For example, the saturation point of lead in zinc at 1500° F. is about 20%, and therefore this molecular ratio will, for example, be half as much when the bath contains 10% lead as when it contains 20% lead. Under favorable conditions of operation by taking advantage of all the factors mentioned the percentage of zinc, with respect to lead in the vapors discharged from the unit, it has been found may be as high as 99.99%.

The bath contained in the evaporating unit 429 tends to become saturated with lead at the temperature of the bath because of the greater rate of evaporation of zinc therefrom than of lead. If it is permitted to become saturated with lead the latter will liquate out to form a layer 453 of lead at the bottom of the bath. Such liquated lead which contains considerable dissolved zinc may be tapped from the unit together with such portion of the bath above it containing dissolved lead as may be desired, and the zinc and lead in the tapped off metal may be separated by liquation at a temperature slightly above the freezing point of zinc, the zinc thus obtained containing about 1.3% lead. In the same way zinc, of the same purity with respect to lead, may be produced by tapping off all or part of the bath before the bath becomes saturated with lead, and liquating the tapped off metal in the same way to separate the zinc and lead. Such zinc containing about 1.3% lead obtained in these ways is that commercially known as "Prime Western Zinc" for which there is a considerable demand, for example, for galvanizing purposes. However, all or part of the zinc containing this amount of lead may, if desired, be recharged to the unit 429, depending upon how much, if any, Prime Western Zinc it is desired to produce for sale.

The substantially chemically pure zinc vapors, with respect to lead discharged from the evaporating unit 429, are condensed in the condensing unit 435 and discharged therefrom through the overflow trap of that unit. Preferably the condensing unit is operated with the bath maintained at a temperature of 900 to 1000° F., the mixture of effluent gases and zinc vapors discharged from that unit being at approximately the same temperature by reason of the condensing operation performed. At this temperature it has been found that a minimum of zinc vapors will be contained in the gases discharged from the unit, practically all of the zinc vapors being condensed while in the unit. When all or part of these gases are recycled through the system they are reheated by the heater 451 to such temperature that they will be discharged into the evaporating unit 429 preferably at the bath temperature maintained in that unit.

Both the evaporating unit 429 and condensing unit 435 of Fig. 23, as schematically shown, are provided with the heating means comprising the resistors 57 and the cooling means comprising the tubes 99 of Figs. 1 to 15. However, these heating means and cooling means, if desired, may take the form of any of those shown by the other modifications above described, in each case the heating means and cooling means preferably being automatically controlled in the ways above described. However, in the evaporating unit 429 the cooling means may be omitted with the heating means preferably being automatically controlled, and in the condensing unit 435 the heating means may be omitted with the cooling means preferably being automatically controlled. It is also possible under some conditions to omit both the heating means and cooling means in the condensing unit 435, in which case the walls of the unit would be of light construction so as readily to radiate heat. However, both the heating means and cooling means are preferably employed in both units and automatically controlled in accordance with fluctuations in the temperature of the bath, as in this way the temperature of the bath can readily be controlled to maintain it substantially constant for preventing it from exceeding undesired maximum and minimum temperatures.

It will also be understood that in the evaporating unit 429 and condensing unit 435 of Fig. 23 there may be substituted, for all or any of the rotors 136, the rotor, described by the Handwerk et al. patent hereinbefore referred to, for raining the bath through the vapor space of the units in the way described by that patent. In making such substitution the baffle bar 43 of course may be omitted and a slab 41 substituted for it, and the speed of rotation of the substituted rotor and its diameter with relation to the height and length of the vapor space of the unit will be made such as will secure raining of the bath liquid through the vapor space in the way described by the patent. However, the rotors 186 are preferably employed to secure the advantages of those rotors and eliminate the disadvantages of the rotor of said patent as hereinbefore pointed out.

If desired, the metal vapors may be moved through the two units 429 and 435 and substantially the same results secured in respect to the purity of the zinc discharged from the evaporating unit and condensed in the condensing unit by, instead of cycling an inert gas through the system, connecting the discharge conduit 439 of the condensing unit to a suction fan or other exhauster. Such a fan or exhauster is indicated at 455 in Fig 23, the discharge pipe 439 from the unit 435 being provided with a gate valve or damper 457 which is opened when the fan or exhauster 455 is to be placed in operation, while the conduit 441 is shown as provided with gate valves or dampers 459 and 461 which are closed under such conditions. However cycling an inert gas through the system is preferably employed instead of the exhauster, as cycling such gas acts to secure a more positive action and enables the system to be operated with assurance at or just above atmospheric pressure so as to insure against leakage of atmospheric air into the evaporating and condensing units, which if allowed to occur would produce objectionable amounts of zinc oxide.

The apparatus shown by Fig. 24 is designed to produce substantially chemically pure zinc and, if desired, at the same time leady zinc such as Prime Western Zinc, from a mixture of metallic vapors and gases discharged from a zinc smelter or other retort operating upon zinciferous material.

As more or less diagrammatically shown in Fig. 24, the mixture of gases and metallic vapors from the smelter or the like is discharged through a conduit 463 into the vapor space of a condensing unit 465 which may be identical in construction with that shown by Figs. 1 to 15. This condensing unit contains a bath 467 of lead entered thereinto in molten condition through the filling trap 77 of the unit, the overflow trap 85 of the unit maintaining the level of this bath constant and permitting the lead to discharge from the bath as it accumulates as hereinafter described. A conduit 469 discharges the vapors and gases from the end of the vapor space of the unit 465 into the vapor space of a second condensing unit 470 which may be identical with that shown by Fig. 22. The unit 470 contains a bath 471 of zinc, which bath may be initially entered into the unit through the filling trap 77 of such unit, and from time to time as it accumulates may be tapped from the unit by way of the normally plugged tap hole 83.

That end of the vapor space of the unit 470 which is opposite its end with which the conduit 469 communicates is shown as connected by a conduit 473 to a third condensing unit 475 which may be identical with the unit 465. This unit 475 contains a bath 477 of zinc which may be initially entered into the unit, maintained therein at a constant level, and discharged therefrom as it accumulates, in the same ways as the lead bath of the unit 465.

In Fig. 24 the end of the vapor space of the unit 475 opposite its end with which the conduit 473 communicates is shown as opening into a discharge conduit 479 from which branches a conduit 481 connected to a nozzle 483 within the conduit 469, so that part of the gases entering the conduit 479 may be recycled through the two units 470 and 475. The gate valve or damper 485 in conjunction with the blower 487 in the conduit 481 controls the proportion of such gases so recycled. In the conduit 481 is also interposed a heater 489 for reheating the gases flowing through said conduit. Recycling the gases acts to increase the speed of movement of the metal vapors through the units 470 and 475, thus to speed up the condensing operations. Such speed of movement may be controlled by adjustment of the gate valve 485 and the speed of the blower 487.

The mixture of metallic vapors and non-condensable gases entering the vapor space of the unit 465 of Fig. 24 from the smelter or other retort will be above the boiling point of zinc, and commonly at about 2200° F., the exact temperature depending upon the temperature maintained in the smelter or other retort. These non-condensable gases if they come from a smelter will consist mostly of carbon monoxide, but if from certain retorts which merely distill zinc from a zinciferous substance may consist mostly of nitrogen. When the mixture of metal vapors and non-condensable gases comes from a smelter such mixture will contain commonly about 50% by volume of such gases, but when coming from retorts which merely distill zinc from the zinciferous material this percentage may be considerably less. Commonly the zinc vapors will contain up to 2 or 3% lead, and in many cases even more. When the mixture comes from a smelter ordinarily the metal vapors will also contain, in vapor form or in the form of small suspended liquid particles, other metals of higher boiling point than zinc, such as copper, iron, bismuth, tin, aluminum, gold, silver, etc. and also a small amount of dust.

The temperature of the lead bath in the unit 465 of

Fig. 24 is maintained above the boiling point of zinc, say from 1700 to 2300° F., and preferably about 2200° F., which will cause the lead and other high boiling point metals to be condensed out of the mixture of vapors and gases passing through the vapor space of the unit, such condensation being caused mainly by reason of the action of the rotor of the unit in raining bath liquid through the mixture as it passes through the unit. This rotor may be the rotor 186 of Figs. 1 to 15, or the rotor of the Handwerk et al. patent hereinbefore referred to, but preferably is the former for the reasons hereinbefore pointed out. This raining of the lead also will remove from the mixture any suspended liquid particles and dust. The high boiling point metals so removed will be carried into the lead bath and ordinarily will be dissolved therein or float thereon.

The temperature of the mixture of vapors and gases discharged from the unit 465 of Fig. 24 will be approximately at the temperature at which the bath is maintained, hence no zinc tends to be condensed in the unit. The mixture discharged is saturated with lead vapors at the bath temperature, and because of the relatively low ratio of the partial vapor pressure of lead to that of zinc in the mixture the percentage of lead in the metal vapors discharged will be relatively low, the purity of the zinc vapors with respect to lead under favorable conditions being about 99.8%, and except under very unfavorable conditions never less than 99%. The only zinc lost in the unit will be that which will dissolve in the lead at the temperature at which the bath is maintained, which amount of dissolved zinc at such temperature will be relatively small. Any chemical blue powder which may form in the unit by reason of the gases entered into it containing some carbon dioxide will fall to the bath, which latter being at a higher temperature than that of the boiling point of zinc will volatilize the zinc in the particles of such blue powder and burst such particles, the volatilized zinc escaping back to the vapor space and the remaining zinc oxide film floating on the surface of the bath. By such action substantially any small amount of carbon dioxide which may be contained in the mixture tends to be removed in the unit 465.

The zinc bath in the unit 470 is maintained at a temperature close to but less than that of the normal boiling point of zinc, say at a temperature of 1500 to 1600° F. Although the unit 470 is a condensing unit, instead of an evaporating unit like the unit 429 of Fig. 23, it acts to secure with respect to the purity of the zinc discharged from it the same results in that respect as secured with the unit 429 and for much the same reasons, the purity of the zinc vapors discharged from the unit 470 therefore being very high, say about 99.9%, with a bath temperature in the unit 470 of about 1500° F. even when the bath in that unit becomes saturated with lead at that temperature. This purity, as above explained in connection with the unit 429, can be further improved, say up to about 99.99% under favorable conditions, by keeping the bath in the unit 470 well below its saturation point with respect to lead.

It will be understood that, as explained in connection with the unit 429 of Fig. 23, if the bath in the unit 470 is permitted to become saturated with lead such load, containing an amount of zinc soluble in lead at the bath temperature, will liquate out. The lead, which so liquates out, may be tapped from time to time from the unit 470. Also, if the lead is not permitted to liquate out, part of the bath liquid may be tapped from the unit from time to time when it reaches the maximum degree of saturation with lead that it is desired not to exceed. In each case fresh zinc may be added to the bath through the filling trap 77 of the unit to replace the tapped off metal. The tapped off liquid lead, which contains an amount of zinc soluble in lead at the bath temperature, and the liquid zinc tapped off if the lead is not permitted to liquate in the unit, may in each case be treated for recovering zinc containing about 1.3% lead, namely, Prime Western Zinc, by reducing the temperature of the tapped off metal to a point close to the freezing point of zinc, at which temperature the lead in excess of 1.3% will liquate out. The mixture of vapors and gases containing high purity zinc may be condensed in the unit 475, which latter may be exactly the same as the unit 435 of Fig. 23 and may be operated in exactly the same way.

By maintaining the temperature of the bath in the unit 470 of Fig. 24 close to the boiling point of zinc as above described, the ratio of the partial vapor pressure of lead to that of zinc in the mixture of vapors and gases in the unit is maintained at a low value, so as to reduce the amount of zinc condensed in the unit with respect to the amount of lead condensed therein, resulting in the vapors discharged from the unit being of high purity with respect to lead. The amount of zinc condensed will be at a minimum when the bath temperature is close to the boiling point of zinc, say 1600° F., such amount increasing as the temperature is reduced. Approximately, however, the same amount of lead will be condensed throughout the range of 1450 to 1600° F. because both are well below the boiling point of lead. Therefore, by varying the temperature at which the bath is maintained, the amount of Prime Western Zinc, as compared to the amount of chemically pure zinc produced by the apparatus, may be varied.

As explained in connection with the apparatus according to Fig. 23, the rotors employed in the apparatus according to Fig. 24 may be those described in the above mentioned Handwerk et al. patent, but preferably in each case the rotor 186 of Figs. 1 to 15 is employed for the reasons hereinbefore mentioned. Also the heating and cooling means of any of the modifications according to Figs. 16 to 21 may be employed in place of those of the modifications shown by Figs. 1 to 15. In each of the units the heating means may be omitted in the apparatus according to Fig. 24, and the temperatures of the baths controlled by the cooling means. It is also possible to make the units of thin wall construction so that they will radiate heat more rapidly than necessary to secure the desired bath temperature, in which case the cooling means may be omitted and the temperature of the bath controlled by the heating means. Preferably, however, both the heating and cooling means are employed for the reason that by use of both the bath temperatures may be more readily maintained at the desired values as above explained.

Commonly considerable difficulty is experienced in recovering zinc of commercial purity from the mixture of metal vapors and gases discharged from a zinc smelter of the electrothermic type, that is to say, one which heats the charge of oxidized zinciferous ore concentrate and reaction carbon by use of the electric arc or electric resistors. Among other impurities zinc ores commonly contain more or less complex arsenic compounds, a considerable proportion of which may remain in the roasted ore concentrate being smelted. Because of the high operating temperature of the type of smelter mentioned such arsenic compounds will be decomposed to liberate vaporous arsenic concurrently with the production of the zinc vapors, and the mixture of the two, together with any other metallic impurities produced and the reaction gases, will be discharged from the smelter into the apparatus for condensing the zinc vapors. Although arsenic condenses at a lower temperature than zinc, it is not possible by use of commercial apparatus heretofore proposed to remove the zinc from the mixture by a condensing operation without at the same time removing the arsenic with the zinc, for the liquid droplets of zinc as they form during the condensing operation will dissolve vaporous arsenic from the remainder of the mixture. For most commercial purposes zinc unless it contains less than 0.01% arsenic is useless, and the vapors discharged from the smelter of the type mentioned commonly may contain at least ten times as much arsenic as that.

Applicant has found, however, that arsenic may be removed from the mixture of gases and metal vapors discharged from the zinc smelter by treating such mixture with copper or copper containing a small amount of iron. Although copper is effective in causing the arsenic to be removed from the mixture its efficacy in that respect is increased by small amounts of iron dissolved in it. The treatment may be effected by adding small amounts of copper or copper containing iron to the lead bath of the unit 465 of Fig. 24, or by initially charging said unit with a bath consisting of copper or brass, containing small amounts of iron. When the operation of the unit is initiated the copper will quickly dissolve zinc, the saturation of zinc in copper being about 25% at 2200° F. Also the copper will dissolve lead, the saturation point of lead in copper being about 35% at this temperature, and when the copper becomes saturated with lead a further liquid tends to form consisting of lead with copper dissolved in it. All these solutions will contain a small amount of iron as well as zinc, copper and lead. More lead and iron, and usually a small amount of copper, will be removed from the mixture and be added to the bath as the operation proceeds, which metals enter these solutions. Hence, because of these factors and variations in the composition of the metallic content of the mixture coming from the smelter, the composition of the bath is most complex and indeterminate from a quantitative standpoint. Further, because of the amount of arsenic in the mixture charged to the unit being a variable, the amount of copper or copper and iron in the bath necessary to secure the desired minimum of arsenic is indeterminate from a quantitative standpoint. However, the composition of the bath from such standpoints is not important, because by analysis of samples of the mixture tapped from it at frequent intervals at its point of discharge from the unit, or of samples taken at frequent intervals from the condensed zinc produced by the subsequent condensing operation, it can be readily and quickly determined from the arsenic content shown by such analyses whether the bath at any given time contains enough copper or copper and iron in solution to reduce to the desired value the amount of arsenic that may be contained in the mixture as charged to the unit. Any amount of copper or copper containing iron in excess of the amount necessary to secure this result is if anything an advantage because it acts to cause a further reduction of the residual amount of arsenic contained in the mixture discharged from the unit, and the smaller the amount of such residual arsenic so much the better.

For the purpose of removing arsenic from the mixture discharged into the unit 465 from the smelter there may be employed any bath temperature in excess of just above the melting point of the bath, which melting point will depend upon the exact composition of the bath. At any such temperature the arsenic will be removed from the mixture of vapors and gases above the bath. The treatment of this mixture by the bath, caused by action of the rotor, will condense and remove lead from the mixture to the same extent as would a lead bath at the same temperature. The bath temperature however is preferably maintained at a rather high value, say about 2000 to 2300° F., as it is found that within such range best results are secured with respect to removing arsenic from the mixture. The lead condensed from the mixture and accumulating in the bath causes the bath more or less continuously to overflow through the overflow trap 85, with the result that the bath tends to become in effect a lead bath. Consequently, to keep the copper content of the bath high enough to secure the desired results with respect to the removal of arsenic, copper or copper containing iron may be added to the bath when the necessity for such addition is shown by any of the above mentioned analyses. To make this addition copper or brass, or the same containing iron, may be entered into the unit through its filling trap 77, or a portion of the bath may be tapped from the unit through its normally plugged tap hole 94 and copper or brass, or the same containing iron, be entered into the unit through its filling trap to replace the tapped off metal.

Another difficulty encountered in condensing zinc from the mixture of metal vapors and reaction gases discharged from a zinc smelter of the above mentioned electrothermic type arises by reason of the large amounts of carbon dioxide commonly contained in such gases. In some cases the amount of carbon dioxide may amount to as much as 5% by volume of such gases at 2200° F., which temperature is commonly that of the gas and vapor mixture discharged from such type of smelter. It will be understood that when zinc is condensed from such mixture the carbon dioxide in the gases tends to oxidize the droplets of liquid zinc as they are formed by the condensing operation to coat them with films of zinc oxide. These oxidized droplets, which constitute the "chemical blue powder" hereinbefore referred to, will not coalesce with the liquid condensed zinc collecting in the condenser, and must be removed from time to time. In fact there even is a tendency for carbon dioxide to react with zinc vapors at temperatures above the boiling point of zinc to form chemical blue powder and, even when the operating temperature of a unit such as the unit 465 of Fig. 24 is above the boiling point of zinc, inadvertent cold spots on the walls of the unit contacted by the mixture act to cause formation of blue powder.

As hereinbefore explained in connection with the unit 465 of Fig. 24, the use of a lead bath in that unit at a high temperature in conjunction with the rotor 186 acts to vaporize the zinc of the blue powder particles formed in that unit to burst those particles and leave behind a film of zinc oxide which floats on the surface of the bath, such blue powder formed in the unit tending to remove the carbon dioxide from the mixture entered into it. The use of the above described bath containing copper will produce the same effect. However in neither case will the carbon dioxide in the mixture discharged from the unit be reduced to a sufficiently low value if the mixture entered into the unit from the smelter contains a large amount of carbon dioxide. To secure best results in respect to economic operation in condensing the zinc vapors from the mixture the amount of carbon dioxide in the gaseous fraction of the mixture should be reduced to as low a value as possible, say to not more than about 0.5% by volume, before subjecting the mixture to the zinc condensing operation.

To reduce the carbon dioxide in the mixture of metallic vapors and gases coming from the smelter the unit 491 shown by Figs. 25 to 28 may be employed. The interior chamber 492 of this unit is shown as divided by a vertical wall 493 into two parts 495 and 497, the part 495 containing the rotor 186 of Figs. 1 to 15 and the part 497 containing a mass 499 of material which at high temperatures will react with carbon dioxide to reduce the latter to carbon monoxide. This mass 499 may consist of broken up coke, anthracite coal, or graphite, but preferably is broken up charcoal. The particle size of the mass as charged is preferably about the size of a man's fist or somewhat larger so as to provide suitable interstices for distribution and passage of the metallic vapor and gas mixture through the mass.

As shown, the wall 493 of the unit 491 is of so-called "checker-work" construction, being built up of blocks 501, of heat refractory material, preferably a material inert with respect to carbon dioxide and incandescent carbon such as high purity alumina. The checker-work construction of the wall provides it with a plurality of spaced openings 503 distributed over its surface, these openings serving to place in free communication the portions of the chamber 492 at opposite sides of said wall.

As shown, the interior chamber 492 of the unit 491 contains a bath 505 which, like the bath of the unit 465 of Fig. 24, may be of lead, or, if arsenic is to be removed from the mixture of vapors and gases entered into the unit, may be of lead containing copper or copper and iron as hereinbefore explained. As shown by Figs. 25 and 26, the unit is further provided with the filling trap 77 and associated passage 75 of Figs. 5 and 6 for entering the bath liquid into the unit, and with the tap hole 83 and associated overflow trap 85 of Fig. 6 for maintaining the bath in the unit at a constant level. Also, as indicated in Fig. 26, the unit is provided with the normally plugged tap hole 94, referred to in connection with Fig. 6, for draining off bath liquid when desired.

As still further shown, the unit 491 is provided with an inlet conduit 507 (Fig. 25) for discharging into the unit the mixture of metallic vapors and gases coming from the smelter. This conduit opens through the wall of the unit opposite the checker-work wall 493 into the part 497 of the interior chamber 492 of the unit at a point above the bath so that the mixture discharged into the unit will flow through the mass 499 of broken up carbonaceous material and enter the vapor space of the part 495 of the chamber 492 at one side of the rotor 186 therein and discharge from that vapor space through the exit conduit 509 at the opposite side of the rotor.

The inlet conduit 507 as shown is funnel-shaped, having a stem 511 which, as best shown in Fig. 27, is square in transverse cross-section, and having an outwardly flaring mouth 513 which is also square in transverse cross-section. The flaring mouth of the conduit is shown as terminating in a flat peripheral end surface 515, that surface abutting the corresponding flat side surface 517 of a square ring-like part 519 set into the vertical slabs 35 of that wall of the unit through which the inlet conduit extends. As best shown in Fig. 28, the opposite vertical sides of this ring-like part 519 are formed with outwardly opening spaced notches 521 in which are set the end portions of bars 523 extending horizontally across said part, the sides and spacing of the bars being such as to prevent entrance into the inlet conduit 507 of pieces of carbonaceous material constituting part of the mass 499. The flaring mouth of the inlet conduit, in conjunction with the wide distribution of the openings 503 in the checker-work wall 493, insures wide distribution of the vapor and gas mixture while passing through the mass 499 of carbonaceous material, so as effectively to remove carbon dioxide from such mixture.

For charging the mass 499 of carbonaceous material into the space between the inlet conduit 507 and the checker-work wall 493 one of the outer vertical walls of the unit is shown as comprising a block 525 (Fig. 26) of heat refractory material, preferably high purity alumina, which block is interposed between, and at its opposite ends abuts with, the inner side of the metallic casing 1 and outer side of the adjacent slab 35, respectively. In this block is formed a charging port 527, this port communicating at opposite ends, respectively, with an aligned opening 528 in the metallic casing 1 and an opening 529 in the slab 35, this opening 529 being at the top of said space to be charged. As shown, the block is provided with an opening 530, of enlarged transverse cross-section, connected to the charging port 527 by an opening surrounded by the frusto-conical surface 531. Exteriorly of the unit there is secured, by welding or otherwise, to the metallic casing 1 a member 533, preferably of cast iron, having an opening 535 of the same cross-section as, and in alignment with, the opening 530 of the block 525. As shown, the member 533 is formed with a hopper portion 537 which communicates with the opening 535 of the member. Extending through the aligned openings 535 and 530 is a removable plug 539, of heat refractory material such as high purity alumina, which has a frusto-conical end surface 541 coacting with the frusto-conical surface 531 of the block 525 to seal the charging port. The plug at its outer end is shown as rigidly carrying a metal bar 543 which is removably secured by nuts 545 to the member 533 for holding the plug in place. By removing the plug carbonaceous material may be entered into the hopper portion 537 of the member 533, from which portion it will fall into the opening 535 of said member and may be pushed therefrom by use of a suitable tool through the opening 529 into the space at the left of the checker-work wall as viewed in Fig. 25 completely to fill that space.

At that end of the space for the carbonaceous material which is opposite its end having the charging port is provided a clean-out port formed by an opening 547 in a block 549 and an aligned opening 551 in the adjacent slab 35. With the block 549 is associated a removable heat refractory plug 553 for normally closing said clean-out port, this block and plug being preferably formed of heat refractory material such as high purity alumina. As will be clear from Fig. 26, the plug 553 is associated with the block 549 and is held in position in substantially the same way as the plug 539 for the charging opening is associated with the block 525 and held in position.

Besides the blocks 501 built up to form the checker-work wall 493, and the blocks 525 and 549 of the charging and clean-out ports respectively, being preferably formed of heat refractory material inert with respect to carbon dioxide and incandescent carbon, such as high purity alumina, the bars 29 at the bottom of the space at the left of the wall 493 as viewed in Fig. 25, and the slabs 35 forming the three sides of said space other than that formed by said wall, and the funnel-shaped member 507, ring-like part 519 and bars 523, are also preferably formed of that same material in the interest of durability. The slabs 41 at the top of the space charged with the carbonaceous material, like the slabs 41 at the top of the space which receives the rotor, preferably are formed of graphite to secure good heat conductivity. The bars 29 at the bottom of the space which receives the carbonaceous material are shown with the cooling tubes 99 omitted, while such tubes are shown in the bars 29 at the bottom of the space which receives the rotor.

Otherwise than as above described, the unit according to Figs. 25 to 28 may be identical with the unit shown by Figs. 1 to 15. However, for the resistor grid may be substituted the fire tubes shown by Fig. 16. Also it will be understood, that as described in connection with the various units shown by Figs. 1 to 24, the rotor of the hereinbefore mentioned Handwerk et al. patent may be substituted for the rotor 186 if it is not desired to secure the advantages of the latter. The temperature of the bath in the unit according to Figs. 25 to 28 is preferably controlled by the thermocouples in the tube 127 immersed in the bath, in the same way as described in connection with the unit according to Figs. 1 to 15 or the unit according to Fig. 16 depending upon whether resistors or fire tubes are employed as the heating means. However, as hereinbefore explained, the cooling means comprising the tubes 99 may be omitted if it is not desired to secure a sharp control of the temperature of the bath.

In operating the unit according to Figs. 25 to 28 the resistor grid comprising the resistor bars 57 will heat the mass 499 of carbonaceous material to incandescence to cause it to reduce to carbon monoxide the carbon dioxide in the gases passing through it, as above explained. For any given temperature the reactions occurring when a mixture of carbon monoxide and carbon dioxide is in contact with incandescent carbon establish an equilibrium between the amounts of these two gases, the higher the temperature the less carbon dioxide. At about 2200° F., for example, this point of equilibrium is such that the amount of carbon dioxide in the mixture of the two gases will be roughly about 0.1% by volume. Consequently the unit is preferably so designed and the input energy to the resistor grid is such that the temperatures of the incandescent carbon and the mixture in contact with it will not be lower than about 2000 to 2300°

F. to secure in this way a low percentage of residual carbon dioxide in the mixture discharged from the unit. With such low percentage of residual carbon dioxide the zinc vapors may be efficiently condensed in a zinc condenser, supplied with the mixture discharged from the unit, without forming unsatisfactory amounts of blue powder. Quantitatively the amount of residual carbon dioxide is not in itself of particular significance. The amount thereof for any given temperature will to some extent vary with the amount of carbon dioxide contained in the mixture coming from the smelter. When the amount of blue powder produced by the subsequent zinc condensing operation is observed to be in excess of what is deemed satisfactory, the temperatures of the incandescent carbon and the mixture being treated by it may be raised for decreasing such amount of blue powder to what is deemed satisfactory. Such raise in temperature may be effected by adjustment of the automatic control mechanism for the bath temperature as described in connection with the wiring diagram of Fig. 5.

The bath, which by reason of the openings 503 in the checker-work wall 493 extends substantially throughout the length and width of the interior chamber 492 of the unit, is also maintained at about 2000 to 2300° F. by the heat radiated downward upon it, and consequently by reason of the action of the rotor the vapors above the bath tend to be maintained at this same temperature, the mixture of vapors and gases above the bath being saturated with lead, and the amount of lead in the mixture discharged from the unit being relatively small.

Further, the mass 499 of carbonaceous material, as well as the bath liquid raining through the vapor space of the unit 491, tends to filter from the incoming mixture from the smelter droplets of high boiling point metals such as copper, iron, tin, and the like, and dust, such dust as is in the form of zinc or iron oxides being reduced by the carbonaceous material in the unit to zinc and iron, respectively. Such high boiling point metals as are in the vapor form will be condensed out of the mixture by reason of the action of the rotor. As the operating temperature is above the boiling point of zinc, no zinc will be condensed in the unit. No zinc will be lost in the unit except such small amount thereof as may dissolve into the bath at the bath temperature. The fractions of the bath tapped through the tap hole 94 from time to time, and those which discharge through the overflow trap 85, may be treated in a known manner for recovering their precious metal, lead and zinc values.

Fresh carbonaceous material may be charged from time to time to the unit through the charging port 527 to replace that consumed by the reaction. When the carbonaceous material is charcoal but little ash will be formed by the reaction, while considerable ash will be formed if such material is coke or anthracite coal, for which reason charcoal is preferably employed as above explained. In the particular form of the unit shown such ash as is formed will work downward to the top of that portion of the bath which lies at the left of the checker-work wall as viewed in Fig. 25, on which portion it will float. The ash may be removed from the unit from time to time by opening the tap hole 555, which latter is normally plugged, for example, by a mass of fireclay 557. When this tap hole is opened by breaking away such plug bath metal will discharge through the tap hole and carry with it the ash floating thereon. Such metal, like that discharged through the overflow trap 85 and normally plugged tap hole 94, may be treated for recovery of its precious metal, zinc and lead values. At infrequent intervals the bath may be drained off, if necessary, through the normally plugged tap hole 94 to remove any heavy particles from the carbonaceous material which may collect on the bottom of the interior chamber of the unit, at which time any clinkers or the like which may under unusual circumstances collect at the bottom of the portion of the chamber receiving the carbonaceous material may be removed by opening the clean-out port 547, 551 and raking them out of such portion of the chamber.

It will be understood, that within the scope of the appended claims, wide deviations may be made from the forms of apparatus and methods herein described without departing from the spirit of the invention.

I claim:

1. The method of purifying zinc contaminated with lead which comprises heating a bath of such zinc in the bottom of a chamber closed against ingress of air for evaporating metal therefrom, discharging the evaporated metal vapors from the space above said bath and condensing them, controlling the temperature of the bath to maintain such temperature less than that of the boiling point of zinc at atmospheric pressure, maintaining the partial vapor pressure of the zinc in the metal vapor mixture above the bath at values that will cause the zinc to evaporate from the bath at such temperature and for concomitantly securing a low ratio of the partial vapor pressure of lead to that of zinc for reducing the amount of lead evaporated in respect to that of the zinc, whereby to cause the metal vapors discharged from the chamber to contain a maximum of zinc and a minimum of lead and to cause the lead content of the bath progressively to increase with respect to its zinc content, and scooping metal from the bath and raining it through the space above the bath for promoting evaporation of zinc from the bath.

2. The method according to claim 1 in which the evaporated metal vapors are moved through the chamber by passing a hot inert gas through said chamber for mixture with said vapors.

3. The method according to claim 1 in which the evaporated metal vapors are moved through the chamber by forced withdrawal of said metal vapors from said chamber.

4. The method according to claim 1 in which the bath metal is tapped from the chamber before it becomes saturated with lead, for further reducing the amount of lead in the vaporous zinc discharged from the chamber.

5. Apparatus for purifying zinc contaminated with lead comprising an evaporator having means forming a chamber adapted to maintain a bath of such contaminated zinc at its bottom, heating means for said bath effective to heat it to a temperature close to but below the boiling point of zinc at atmospheric pressure for evaporating zinc and lead therefrom, a condenser comprising means forming a chamber, connections for discharging the evaporated vapors from the first mentioned chamber to the second mentioned chamber for condensing them in the latter, and means for circulating a heated gas through the evaporator and condenser in series for raising the pressure therein to above atmospheric and for permitting such evaporation to occur in the evaporator at said bath temperature below the boiling point of zinc at atmospheric pressure.

6. Apparatus according to claim 22 in which the means for causing the vapors to flow from the chamber of the evaporator to that of the condenser comprises an exhauster the inlet of which is connected to the vapor space of the condenser for directly withdrawing vapors from such space and discharging them to the exterior of said apparatus.

7. Apparatus according to claim 22 in which the conduit means connecting the vapor spaces of the two chambers communicates with each at one side of a rotor therein, the means for causing the vapors in the evaporator chamber to flow through said conduit means to the condenser chamber comprising a second conduit means communicating with said vapor spaces of said chambers at the opposite sides of said rotors from the first mentioned conduit means to form a circulatory system in which said chambers are connected in series by said two conduit means, means for entering an inert gas into such circulatory system, means for forcing circulation of said gas through said system in such direction that it flows through the vapor space of said evaporator chamber to that of said condenser chamber, and a heater for said gas forming part of said second conduit means.

8. Apparatus according to claim 22 in which the conduit means connecting the vapor spaces of the two chambers communicates with each at one side of a rotor therein, the means for causing the vapors in the evaporator chamber to flow through said conduit means to the condenser chamber comprising an exhauster connected to the vapor space of said condenser chamber at the opposite side of the rotor therein.

9. The method of producing high purity zinc from a mixture of zinc vapors and reaction gases contaminated with lead vapors discharged from a zinc smelter, which method comprises maintaining in the bottom of a chamber, closed against ingress of air, a bath of metal at a temperature above the boiling point of zinc but below the boiling point of lead; passing said mixture through the space in said chamber above said bath; scooping metal from said bath and raining it through such space for condensing lead from said mixture without condensing zinc therefrom, to produce a residual mixture at a temperature above the boiling point of zinc containing a small amount of residual lead vapors; and discharging such residual mixture from said chamber and treating it for recovery of its zinc content.

10. The method of producing high purity zinc from a mixture of contaminated zinc vapors and reaction gases discharged from a zinc smelter, which method comprises maintaining in the bottom of a chamber, closed against ingress of air, a bath of metal at a temperature above the boiling point of zinc but below the boiling point of lead; passing said mixture through the space in said chamber above said bath; scooping metal from said bath and raining it through such space for condensing lead from said mixture without condensing zinc therefrom, to produce a residual mixture at a temperature above the boiling point of zinc containing a small amount of residual lead; passing such residual mixture into a second chamber for passage therethrough above a zinc bath containing dissolved lead in the bottom of said second chamber maintained at a temperature less than but close to the boiling point of zinc, namely, from about 1500 to 1600° F.; scooping metal from said bath in said second chamber and raining it through said mixture above such bath for condensing zinc and lead from said mixture and adding them to that bath and causing the temperature of the mixture being discharged from said second chamber to be at the bath temperature; and passing the mixture discharged from said second chamber to a zinc condenser for condensing the purified zinc of such mixture.

11. The method according to claim 10 in which the mixture of gases and metal vapors discharged from the second chamber is conducted to a third chamber, in which third chamber the metal vapors are condensed from said gases, discharging said gases from said third chamber, reheating part of such discharged gases, and mixing such reheated part with the mixture of gases and metal vapors passed into said second chamber for recycling such part through said second and third chambers for moving the metal vapors therethrough.

12. The method according to claim 10 in which the mixtures of gases and metal vapors while in the first and second chambers are caused to travel in paths through which the scooped up bath metals are poured downward in the form of thin unsupported curtains transverse to said paths.

13. The method according to claim 10 in which the mixture of gases and metal vapors discharged from the second chamber is conducted to a third chamber, in which third chamber the metal vapors are condensed from said gases, discharging said gases from said third chamber, reheating part of such discharged gases, and mixing such reheated part with the mixture of gases and metal vapors passed into said second chamber for recycling such part through said second and third chambers for moving said metal vapors therethrough, the mixtures of gases and metal vapors while in the first and second chambers being caused to travel in paths through which the scooped up bath metals are poured downward in the form of thin unsupported curtains transverse to said paths.

14. Apparatus for recovering zinc of high purity from a mixture of metal vapors and reaction gases discharged from a zinc smelter comprising means forming three chambers connected for series flow of such mixture through them, the first chamber being adapted to contain at its bottom a metal bath which is predominantly lead, the second chamber being adapted to contain at its bottom a zinc bath containing dissolved lead, and the third chamber being adapted to contain at its bottom a zinc bath; each chamber having therein a rotor for scooping metal from the bath therein and raining it through the vapor space above said bath for return to said bath; means for maintaining the bath in said first chamber at a temperature above the boiling point of zinc for condensing lead from said mixture without condensing zinc therefrom while said mixture passes through said first chamber; means for maintaining the temperature of the bath in the second chamber below but close to the boiling point of zinc for condensing a maximum of the residual lead and a minimum of the zinc from said mixture while in said second chamber, means for maintaining such temperature of the zinc bath in the third chamber as will condense to liquid zinc substantially all residual zinc in the mixture entered into said third chamber, and means for heating and conducting part of the gases discharged from the third chamber to the mixture discharging from the first chamber for admixture therewith for moving said metal vapors through said second and third chambers.

15. Apparatus according to claim 14 in which the rotors in at least the first and second chambers are so formed, and in which means are provided for rotating them at such speeds, as will cause them to pour the bath metals scooped up by them downward in the form of thin unsupported curtains of such metal extending transversely of the direction of flow of the mixture through said chambers.

16. The method of removing arsenic from zinc which comprises scrubbing such zinc, while in vapor form and at a temperature above the boiling point of pure zinc, with liquid metal, also at a temperature above the boiling point of zinc, containing sufficient copper to remove enough of the arsenic from the zinc vapors to reduce the amount thereof with respect to the amount of zinc to less than 0.01%.

17. The method of removing lead and arsenic from the mixture of metal vapors and gases discharged from a zinc smelter, together with such iron, copper, silver, and other high boiling point metals as may be contained in such mixture, which comprises scrubbing such mixture while at a temperature above the boiling point of pure zinc with liquid metal, also at a temperature above the boiling point of zinc, for removing from the mixture lead and such other high boiling point metals, said liquid metal containing sufficient copper to remove enough arsenic from the mixture to reduce its arsenic content with respect to its zinc content to less than 0.01%.

18. The method of removing lead and arsenic from the mixture of metal vapors and gases discharged from a zinc smelter, together with such iron, copper, silver, and other high boiling point metals as may be contained in such mixture, which method comprises passing such mixture while at a temperature above the boiling point of pure zinc through a chamber at the bottom of which is a metal bath also at a temperature above the boiling point of pure zinc, scooping metal from said bath and raining it through said mixture for removing lead and such other high boiling point metals from said mixture and causing them to enter the bath, the bath containing sufficient copper value or copper and iron values to cause the bath metal so rained through said mixture to remove enough arsenic from the mixture to reduce its arsenic content with respect to its zinc content to less than 0.01%.

19. The method of removing lead and arsenic from the mixture of metal vapors and gases discharged from a zinc smelter, together with such iron, copper, silver, and other high boiling point metals as may be contained in such mixture, which method comprises passing such mixture while at a temperature above the boiling point of pure zinc through a chamber at the bottom of which is a metal bath also at a temperature above the boiling point of pure zinc, scooping metal from said bath and raining it through said mixture for removing lead and such other high boiling point metals from said mixture and causing them to enter the bath, the bath containing sufficient copper value or copper and iron values to cause the bath metal so rained through said mixture to remove enough arsenic from the mixture to reduce its arsenic content with respect to its zinc content to less than 0.01%, removing bath metal from said chamber as said bath becomes diluted with the lead so removed from the mixture and entering, into the remaining bath metal, metal containing or consisting of copper or copper and iron to maintain said copper value or copper and iron values of the bath.

20. The method of treating a mixture of metal vapors and gases discharged from a zinc smelter for removing carbon dioxide and lead from the mixture prior to subjecting it to a condensing operation for recovering zinc therefrom, which method comprises passing the mixture, while at a temperature above the boiling point of pure zinc, in series through two zones above a metal bath common to both zones, which bath is also at a temperature above the boiling point of pure zinc, bringing said mixture into intimate contact with incandescent carbon in the first zone for reducing carbon dioxide in the mixture to carbon monoxide and filtering from the mixture liquid globules of high boiling point metals for causing them to enter said bath, and scooping bath metal from the portion of the bath at the second zone and raining it through the mixture passing through such zone for condensing lead from the mixture without condensing zinc therefrom.

21. The method of treating a mixture of metal vapors and gases discharged from a zinc smelter for removing carbon dioxide and lead from the mixture prior to subjecting it to a condensing operation for recovering zinc therefrom, which method comprises passing the mixture, while at a temperature above the boiling point of pure zinc, in series through two zones above a metal bath common to both zones, which bath is also at a temperature above the boiling point of pure zinc, bringing said mixture into intimate contact with incandescent carbon in the first zone for reducing carbon dioxide in the mixture to carbon monoxide and filtering from the mixture liquid globules of high boiling point metals for causing them to enter said bath, and scooping bath metal from the portion of the bath at the second zone and raining it through the mixture passing through such zone for condensing lead from the mixture without condensing zinc therefrom, the bath also containing sufficient copper or copper and iron to remove from the mixture passing through the second zone enough of any arsenic contained in the mixture to reduce its arsenic content with respect to its zinc content to less than 0.01%.

22. Apparatus for purifying zinc contaminated with smaller amounts of lead comprising an evaporator having means forming a chamber adapted to maintain a bath of such contaminated zinc therein, means for heating said bath to a temperature that will evaporate both zinc and lead therefrom, means forming a discharge opening from the space in said chamber above said bath for discharge of the evaporated vapors, means for causing the vapors discharged through said opening to be substantially at the temperature of the bath and therefore saturated with both zinc and lead comprising one or more power driven rotors in said chamber adapted to scoop liquid metal from the upper portion of said bath and rain it through the space above said bath in contact with the vapors in said space and for return to said bath, a zinc condenser having means providing a second chamber adapted to maintain therein a bath of zinc condensed therein, conduit means connecting said opening from said first chamber to the space above the bath in said second chamber for discharge into said space of the vapors flowing through said opening, means for facilitating condensation of zinc from the vapors in said second chamber comprising one or more power driven rotors in said second chamber adapted to scoop liquid metal from the upper portion of the bath in said chamber and rain it through the space above such bath for contact with the vapors in said space and for return to said bath, and means acting to enforce flow of the vapors in said chamber of the evaporator from said chamber into said second chamber by way of said conduit means and through said second chamber.

23. Apparatus according to claim 22 in which the rotors are so formed as to provide openings extending from one lateral side thereof to the other for flow of vapors through them from one of said sides to the other, the lower lateral side portions of said rotors being adapted to be laterally partially submerged in the baths, the walls of the chambers containing said rotors cooperating with their end and upper lateral side portions to cause said rotors to divide the portions of said chambers above the baths into compartments separated by the unsubmerged portions of said rotors and placed in communication by said openings, each rotor having means for scooping up the bath liquid and directly pouring it in the form of unsupported vertical liquid curtains through the vapors transversely of the direction of flow of the vapors from the compartment at one side of the rotor to the compartment at its opposite side.

24. In an apparatus for condensing metal from a hot zinciferous vapor including side, top and bottom walls forming a chamber having spaced vapor inlet and outlet openings and which chamber is adapted to maintain a bath of liquid material in its bottom portion, a rotor in said chamber between said openings, means for horizontally mounting said rotor transverse to the path of movement of the vapor in flowing from said inlet opening to said outlet opening, said rotor mounting being at such an elevation that only the lower portion of said rotor is submerged in said liquid material and its periphery operatively coacts with the top wall of the chamber to act to form a seal for preventing flow of vapor through the chamber above the rotor, said rotor having transverse passageways therethrough and including a plurality of spaced scoops arranged for gathering said liquid material from the bottom portion of said chamber, and means for rotating said rotor on its mounting for charging said scoops with said liquid material and for elevating and changing the angular position of the charged scoops at a rate of speed permitting the pouring of the liquid material therefrom by gravity in the path of said moving vapors.

25. The structure of claim 24 characterized in that the top wall of the chamber with which the periphery of the rotor coacts includes a portion having an arcuate bottom surface conforming to such periphery.

References Cited in the file of this patent

UNITED STATES PATENTS

| | | |
|---|---|---|
| 708,044 | Hopkins | Sept. 2, 1902 |
| 905,753 | Shortman | Dec. 1, 1908 |
| 1,848,559 | Cheyney | Mar. 8, 1932 |

(Other references on following page)

UNITED STATES PATENTS

| | | |
|---|---|---|
| 1,885,412 | Buskett | Nov. 1, 1932 |
| 1,994,352 | Ginder et al. | Mar. 12, 1935 |
| 1,994,358 | Holstein et al. | Mar. 12, 1935 |
| 2,106,505 | Morin | Jan. 25, 1938 |
| 2,267,698 | Jones | Dec. 23, 1941 |
| 2,348,194 | Crane et al. | May 9, 1944 |
| 2,429,584 | Poland | Oct. 21, 1947 |
| 2,457,544 | Handwerk et al. | Dec. 28, 1948 |
| 2,457,551 | Robson | Dec. 28, 1948 |
| 2,463,468 | Poland | Mar. 1, 1949 |
| 2,473,304 | Robson | June 14, 1949 |
| 2,513,713 | Cope | July 4, 1950 |
| 2,615,706 | Davey | Oct. 28, 1952 |
| 2,671,725 | Robson et al. | Mar. 9, 1954 |